(12) United States Patent
Ando et al.

(10) Patent No.: US 8,670,047 B2
(45) Date of Patent: Mar. 11, 2014

(54) IMAGE PROCESSING APPARATUS, IMAGING APPARATUS, IMAGE PROCESSING METHOD, AND PROGRAM

(75) Inventors: Seishiro Ando, Tokyo (JP); Daisuke Nakao, Tokyo (JP)

(73) Assignee: Sony Corporation (JP)

(*) Notice: Subject to any disclaimer, the term of this patent is extended or adjusted under 35 U.S.C. 154(b) by 616 days.

(21) Appl. No.: 12/927,322

(22) Filed: Nov. 12, 2010

(65) Prior Publication Data
US 2011/0157423 A1 Jun. 30, 2011

(30) Foreign Application Priority Data
Dec. 28, 2009 (JP) ................ P2009-297766

(51) Int. Cl.
*H04N 5/76* (2006.01)
*H04N 5/228* (2006.01)

(52) U.S. Cl.
USPC ............ 348/231.6; 348/222.1; 348/239

(58) Field of Classification Search
USPC .......... 348/222.1, 231.99, 231.1–231.9, 239, 348/36; 345/629, 634, 473; 386/248, 278, 386/280; 382/284, 276
See application file for complete search history.

(56) References Cited

U.S. PATENT DOCUMENTS

| | | | |
|---|---|---|---|
| 6,243,103 B1 * | 6/2001 | Takiguchi et al. ............ | 345/634 |
| 6,424,752 B1 * | 7/2002 | Katayama et al. ............ | 382/284 |
| 6,744,931 B2 * | 6/2004 | Komiya et al. ............... | 382/284 |
| 8,094,204 B2 * | 1/2012 | Tsurumi ...................... | 348/222.1 |
| 8,264,559 B2 * | 9/2012 | Shioya et al. ................ | 348/218.1 |
| 8,379,054 B2 * | 2/2013 | Katayama et al. ............ | 345/629 |
| 2008/0050035 A1 * | 2/2008 | Tsurumi ...................... | 382/276 |
| 2009/0115864 A1 | 5/2009 | Ogawa | |
| 2010/0039447 A1 * | 2/2010 | Nakao ......................... | 345/634 |
| 2010/0066840 A1 * | 3/2010 | Asukai et al. ................ | 348/207.1 |
| 2010/0111499 A1 * | 5/2010 | Tsurumi ...................... | 386/107 |
| 2010/0135635 A1 * | 6/2010 | Fukumoto et al. ............ | 386/52 |
| 2010/0157085 A1 * | 6/2010 | Sasaki ........................ | 348/222.1 |
| 2010/0218140 A1 * | 8/2010 | Feke et al. ................... | 715/810 |
| 2010/0245540 A1 * | 9/2010 | Fukuzawa .................... | 348/36 |
| 2011/0122154 A1 * | 5/2011 | Kawai et al. ................. | 345/629 |
| 2011/0122275 A1 * | 5/2011 | Kawai et al. ................. | 348/222.1 |
| 2011/0149016 A1 * | 6/2011 | Kimura ....................... | 348/36 |
| 2011/0157423 A1 * | 6/2011 | Ando et al. .................. | 348/231.6 |

FOREIGN PATENT DOCUMENTS

| | | | |
|---|---|---|---|
| JP | 2004-133637 A | | 4/2004 |
| JP | 2009-044573 A | | 2/2009 |
| JP | 2009-118009 A | | 5/2009 |

\* cited by examiner

*Primary Examiner* — Aung S Moe
(74) *Attorney, Agent, or Firm* — Lerner, David, Littenberg, Krumholz & Mentlik, LLP

(57) ABSTRACT

An image processing apparatus includes an imaging operation state acquiring unit that acquires imaging operation state information representing imaging operation states at the time of an imaging operation for a plurality of images that are consecutively generated in a time series, an image processing unit that performs image processing, which is used for generating a synthesized image representing transition in a specific operation of an observed subject included in the plurality of images, based on the acquired imaging state information for the plurality of images, and an image synthesis unit that generates a synthesized image by synthesizing the plurality of images for which the image processing has been performed.

7 Claims, 29 Drawing Sheets

FIG. 4A
FIG. 4B
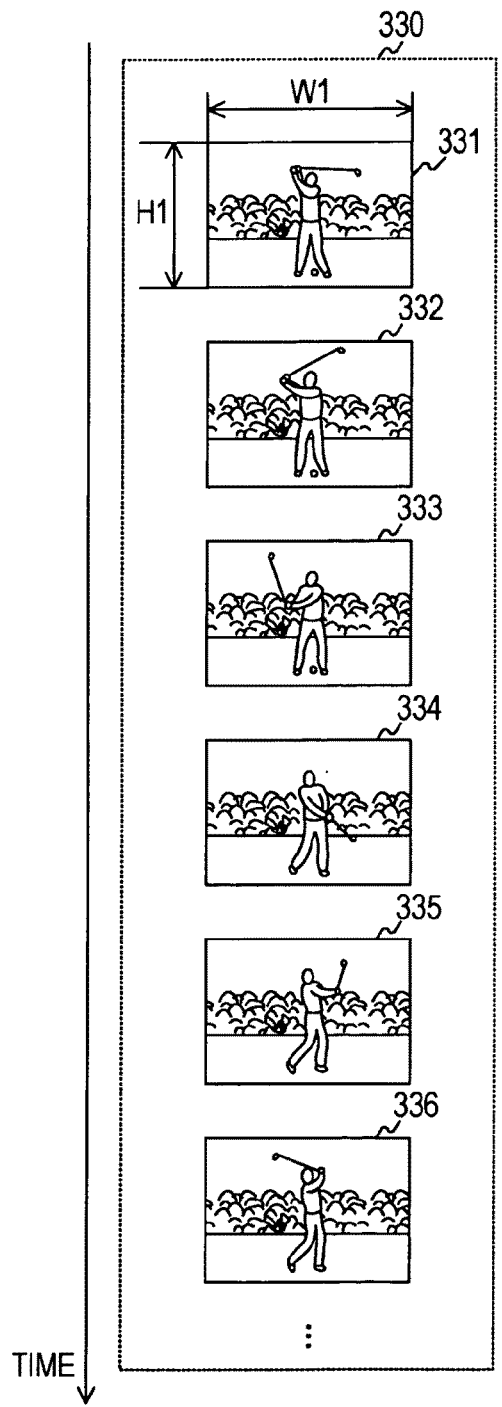
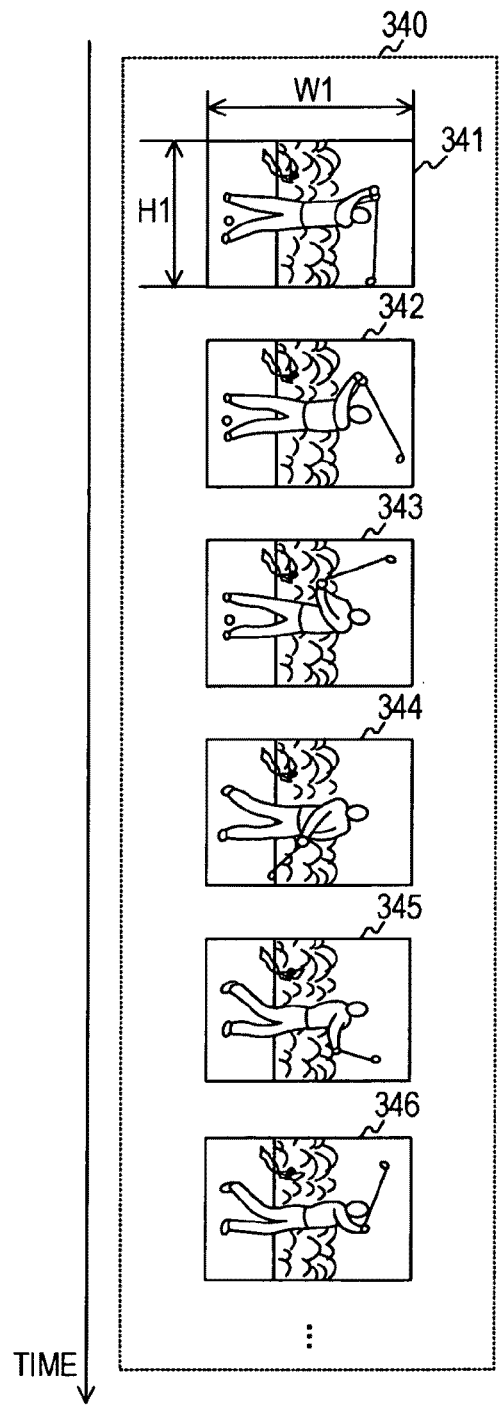

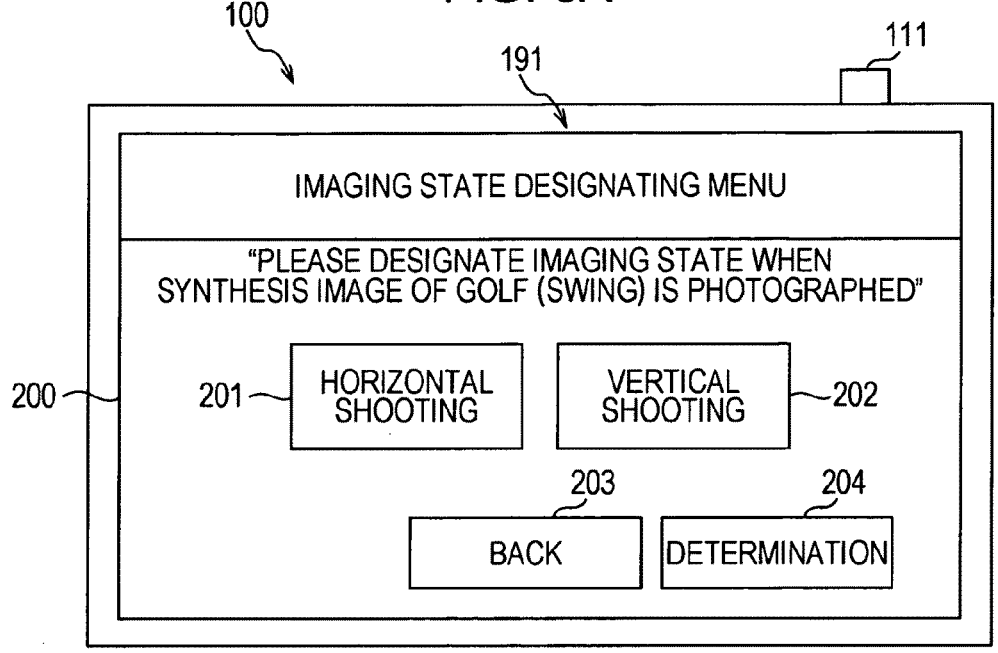

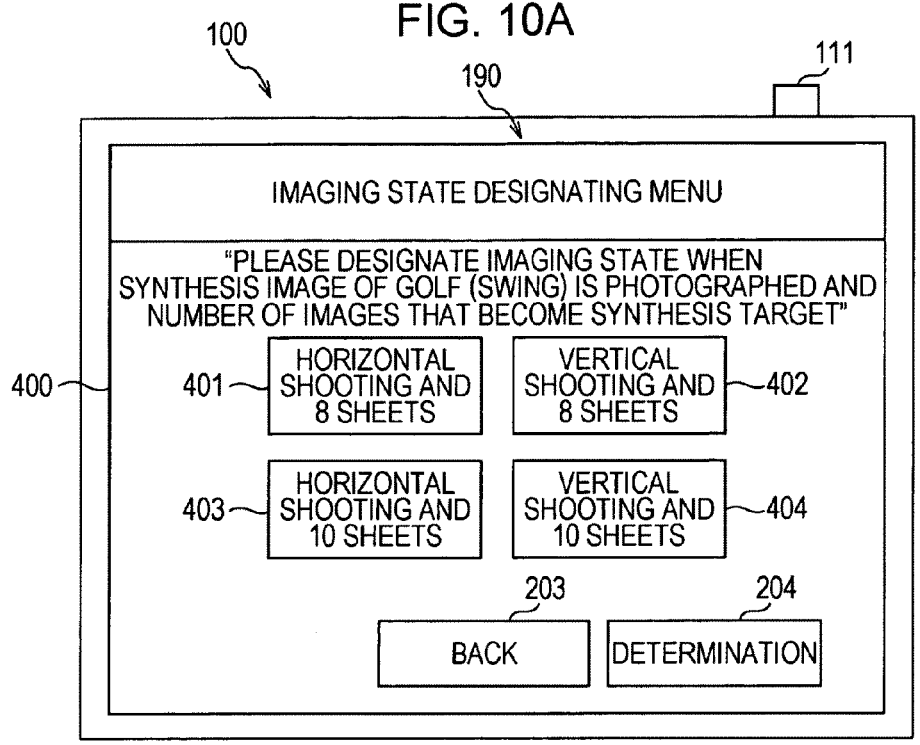

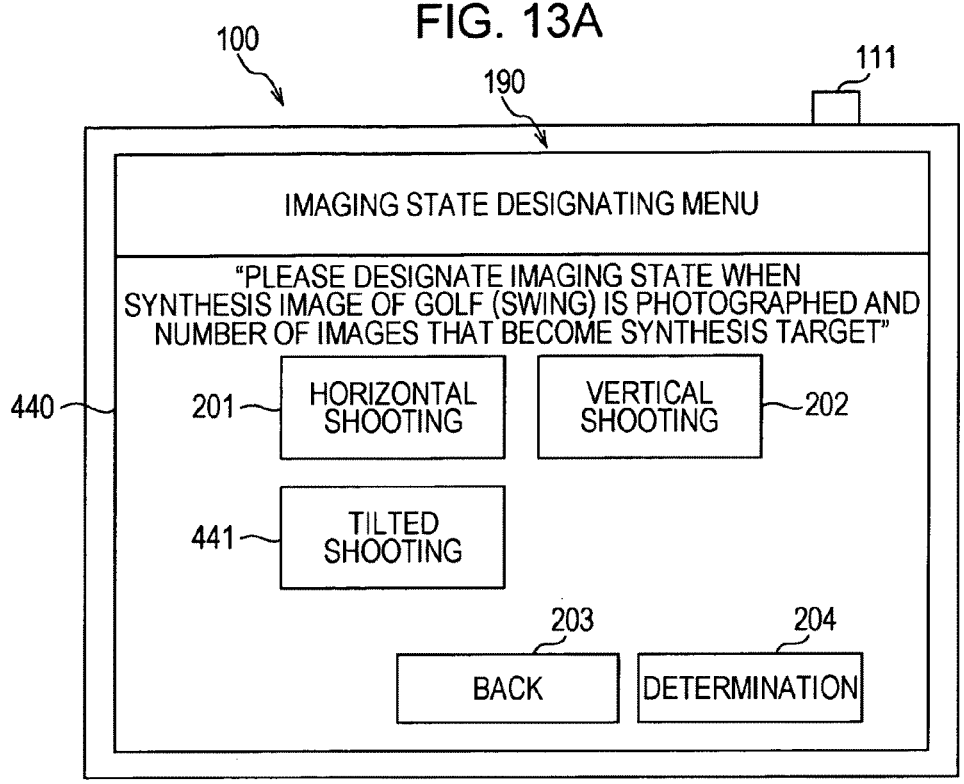

FIG. 23

| | CORRESPONDING FIGURE 671 | OBSERVED SUBJECT STATE 672 | OPERATION RANGE 673 | IMAGING OPERATION METHOD 674 | ASPECT RATIO OF SYNTHESIS TARGET IMAGE 675 |
|---|---|---|---|---|---|
| GOLF (SWING) | Fig. 3A | VERTICAL | SMALL | FIXED | 3:4 |
| BASEBALL (BATTING) | Fig. 22A | VERTICAL | SMALL | FIXED | 4:5 |
| BASEBALL (PITCHING) | Fig. 22B | VERTICAL | MEDIUM (HORIZONTAL DIRECTION) | FIXED | 4:3 |
| SOCCER (SHOOT) | Fig. 22C | VERTICAL | LARGE (HORIZONTAL DIRECTION) | FIXED | 5:3 |
| TENNIS (SERVE) | Fig. 22D | VERTICAL | SMALL | FIXED | 3:4 |
| BASKET BALL (SHOOT) | Fig. 22E | VERTICAL | MEDIUM (VERTICAL DIRECTION) | FIXED | 1:2 |
| SWIM | Fig. 22F | HORIZONTAL | MOVING ALL THE TIME | MOVING | 2:1 |
| JAPANESE FENCING | Fig. 22G | VERTICAL | LARGE (HORIZONTAL DIRECTION) | FIXED | 5:3 |
| ATHLETICS (SHORT-DISTANCE SPRINT) | Fig. 22H | VERTICAL | MOVING ALL THE TIME | MOVING | 1:2 |
| TILE BREAKING | — | VERTICAL | SMALL | FIXED | 1:2 |

FIG. 26

| 720 | | 721 ROTATION ANGLE | 722 ASPECT RATIO (HORIZONTAL : VERTICAL) OF SYNTHESIS TARGET IMAGE | 723 SIZE OF SYNTHESIS TARGET IMAGE (HORIZONTAL × VERTICAL) |
|---|---|---|---|---|
| 751 GOLF (SWING) | HORIZONTAL SHOOTING | 0 DEGREES | 3:4 | H2×W2 |
| | VERTICAL SHOOTING | 90 DEGREES | 3:4 | H2×W2 |
| 752 BASEBALL (BATTING) | HORIZONTAL SHOOTING | 0 DEGREES | 4:5 | ... |
| | VERTICAL SHOOTING | 90 DEGREES | 4:5 | ... |
| 753 BASEBALL (PITCHING) | HORIZONTAL SHOOTING | 0 DEGREES | 4:3 | ... |
| | VERTICAL SHOOTING | 90 DEGREES | 4:3 | ... |
| 754 SOCCER (SHOOT) | HORIZONTAL SHOOTING | 0 DEGREES | 5:3 | ... |
| | VERTICAL SHOOTING | 90 DEGREES | 5:3 | ... |
| 755 TENNIS (SERVE) | HORIZONTAL SHOOTING | 0 DEGREES | 3:4 | ... |
| | VERTICAL SHOOTING | 90 DEGREES | 3:4 | ... |
| 756 BASKET BALL (SHOOT) | HORIZONTAL SHOOTING | 0 DEGREES | 1:2 | ... |
| | VERTICAL SHOOTING | 90 DEGREES | 1:2 | ... |
| 757 SWIM | HORIZONTAL SHOOTING | 0 DEGREES | 2:1 | ... |
| | VERTICAL SHOOTING | 90 DEGREES | 2:1 | ... |
| 758 JAPANESE FENCING | HORIZONTAL SHOOTING | 0 DEGREES | 5:3 | ... |
| | VERTICAL SHOOTING | 90 DEGREES | 5:3 | ... |
| 759 ATHLETICS (SHORT-DISTANCE SPRINT) | HORIZONTAL SHOOTING | 0 DEGREES | 1:2 | ... |
| | VERTICAL SHOOTING | 90 DEGREES | 1:2 | ... |
| 760 TILE BREAKING | HORIZONTAL SHOOTING | 0 DEGREES | 1:2 | ... |
| | VERTICAL SHOOTING | 90 DEGREES | 1:2 | ... |

FIG. 28A
FIG. 28B
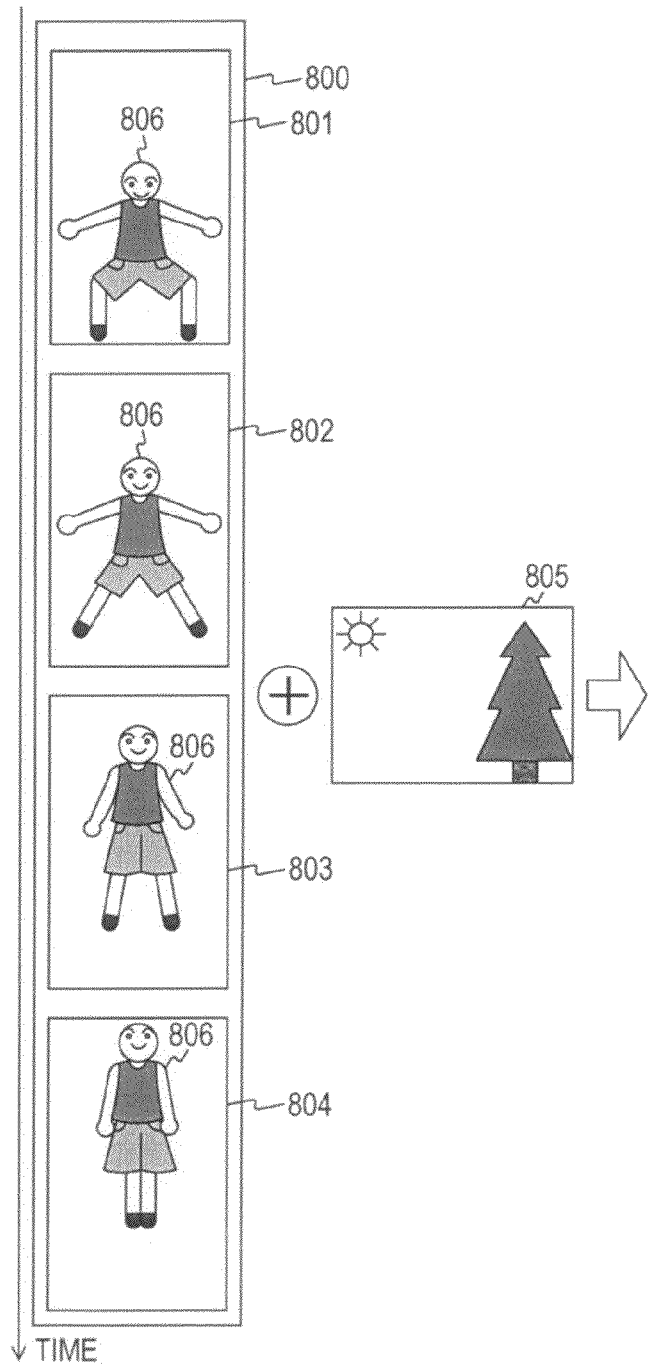
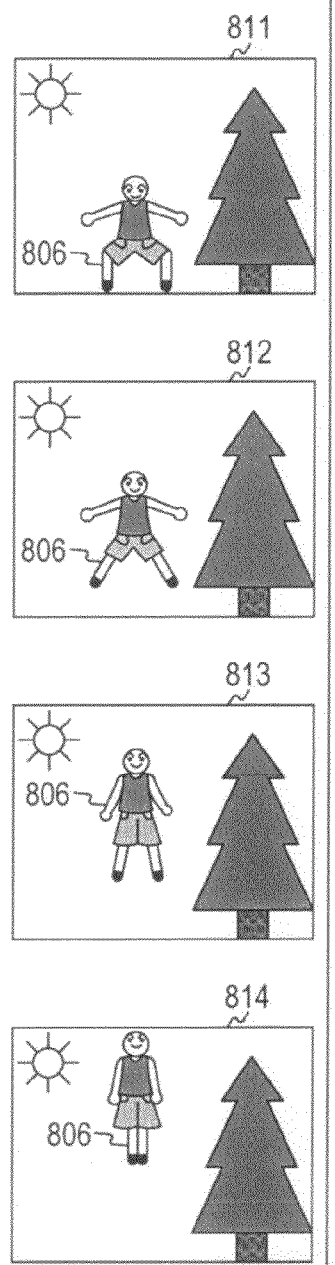

IMAGE PROCESSING APPARATUS, IMAGING APPARATUS, IMAGE PROCESSING METHOD, AND PROGRAM

CROSS-REFERENCE TO RELATED APPLICATION

The present application claims priority from Japanese Patent Application No. JP 2009-297766 filed in the Japanese Patent Office on Dec. 28, 2009, the entire content of which is incorporated herein by reference.

BACKGROUND OF THE INVENTION

1. Field of the Invention

The present invention relates to an image processing apparatus, and more particularly, to an image processing apparatus, an imaging apparatus, and an image processing method that process a plurality of images that are consecutive in a time series, and a program that allows a computer to perform the method.

2. Description of the Related Art

Recently, imaging apparatuses such as digital still cameras and digital video cameras (for example, camera-integrated recorders) that generate a captured image (image data) by imaging a subject such as a person and record the captured image that has been generated as an image content are widely used. In addition, recording, for example, the appearance of sports such as golf and a baseball game by using such imaging apparatuses as contents is widely performed. The contents (for example, moving image contents) recorded as above can be used, for example, for checking the form of sports (for example, a golf swing or a batting (a baseball game)).

For example, in a case where the form of sports (for example, a golf swing or batting (baseball game)) is checked, a synthesized image generating method in which an image representing the transition in the operation is generated as a synthesized image for easy understanding of the transition in the operation is proposed. For example, an imaging apparatus that selects a plurality of images from among consecutively photographed images at a predetermined interval and generates a synthesized image by using the plurality of images that have been selected is proposed (for example, see Japanese Unexamined Patent Application Publication No. 2009-44573 (FIG. 9)).

SUMMARY OF THE INVENTION

According to the above-described technologies in related art, for example, a synthesized image that represents the transition in the operation of a person who makes a golf swing can be generated.

Here, a case where images used for generating a synthesized image are photographed will be assumed. For example, in accordance with a user's taste for the composition, a case where photographing is performed such that the imaging range is long in the vertical direction or a case where photographing is performed such that the imaging range is long in the horizontal direction may be considered. However, according to the above-described technology in related art, in a case where a plurality of images used for generating a synthesized image are photographed, photographing is necessarily performed in the state in which the imaging range is long in the horizontal direction. Accordingly, for example, in a case where a standing person as a subject is photographed such that the imaging range is long in the vertical direction, according to the above-described technology in related art, it is difficult to appropriately generate a synthesized image.

Accordingly, for example, in a case where an image (for example, a synthesized image) that represents the transition in the operation of a golf swing or batting (a baseball game) is generated, it is important to appropriately generate a synthesized image by using images generated in accordance with user's taste for the composition.

It is desirable to appropriately generate a synthesized image by using images that are generated in accordance with user's taste for the composition.

According to an embodiment of the present invention, there are provided an image processing apparatus including: an imaging operation state acquiring unit that acquires imaging operation state information representing imaging operation states at the time of an imaging operation for a plurality of images that are consecutively generated in a time series; an image processing unit that performs image processing, which is used for generating a synthesized image representing transition in a specific operation of an observed subject included in the plurality of images, based on the acquired imaging state information for the plurality of images; and an image synthesis unit that generates a synthesized image by synthesizing the plurality of images for which the image processing has been performed, an image processing method, and a program that allows a computer to perform the method. Accordingly, a function of acquiring the imaging operation state information, performing image processing for generating a synthesized image for the plurality of images based on the acquired imaging state information, and generating a synthesized image by synthesizing the plurality of images for which the image processing has been performed is implemented.

In the above-described embodiment, the imaging operation state acquiring unit may acquire a rotation angle with an imaging direction at the time of the imaging operation being used as an axis as the imaging operation state information. In such a case, a function of acquiring the rotation angle with the imaging direction at the time of the imaging operation being used as an axis as the imaging operation state information is implemented.

In the above-described embodiment, the image processing unit may perform a rotation process for each of the plurality of images in accordance with the rotation angle that is specified by the imaging state information. In such a case, a function of performing a rotation process for each of the plurality of images in accordance with the rotation angle that is specified by the imaging state information is implemented.

In the above-described embodiment, it may be configured that, in a case where the rotation angle specified by the imaging state information is a predetermined angle, the image processing unit performs the rotation process for each of the plurality of images, and, in a case where the rotation angle specified by the imaging state information is not the predetermined angle, the image processing unit does not perform the rotation process for the plurality of images. In such a case, a function of performing the rotation process for each of the plurality of images in a case where the rotation angle specified by the imaging state information is a predetermined angle and not performing the rotation process for the plurality of images in a case where the rotation angle specified by the imaging state information is not the predetermined angle is implemented.

In the above-described embodiment, the image processing unit may perform the image processing so as to allow the plurality of images, for which the rotation process is performed in a case where the rotation angle specified by the imaging state information is the predetermined angle, and the plurality of images, for which the rotation process is not performed in a case where the rotation angle specified by the imaging state information is not the predetermined angle, to have a predetermined size corresponding to a size of the synthesized image. In such a case, a function of performing the image processing so as to allow the plurality of images, for which the rotation process is performed in a case where the rotation angle specified by the imaging state information is the predetermined angle, and the plurality of images, for which the rotation process is not performed in a case where the rotation angle specified by the imaging state information is not the predetermined angle, to have a predetermined size corresponding to a size of the synthesized image is implemented.

In the above-described embodiment, the image processing unit may perform the image process so as to allow each of the plurality of images to have a predetermined size corresponding to the size of the synthesized image. In such a case, a function of performing the image process so as to allow each of the plurality of images to have a predetermined size corresponding to the size of the synthesized image is implemented.

The above-described embodiment may further include: a storage unit that stores processing information relating to a plurality of types of predetermined operations; and an operation receiving unit that receives a designation operation that designates a desired predetermined operation from among the plurality of types of the predetermined operations in which the processing information is stored. In such a case, the image processing unit performs the image processing for the plurality of images by using the processing information relating to the designated predetermined operation based on the acquired imaging state information. In the case, a function of performing image processing for a plurality of images based on acquired imaging state information by using processing information relating to a designated predetermined operation in a case where a designation operation that designates the desired predetermined operation from among the plurality of types of the predetermined operations is received is implemented.

According to another embodiment of the present invention, there is provided an imaging apparatus including: an imaging unit that generates a plurality of images that are consecutive in a time series by imaging a subject; an imaging operation state acquiring unit that acquires imaging operation state information representing imaging operation states at the time of an imaging operation for the plurality of generated images; an image processing unit that performs image processing, which is used for generating a synthesized image representing transition in a specific operation of an observed subject included in the plurality of images, based on the acquired imaging state information for the plurality of images; and an image synthesis unit that generates a synthesized image by synthesizing the plurality of images for which the image processing has been performed, an image processing method, and a program that allows a computer to performs the method. Accordingly, a function of acquiring the imaging operation state information, performing image processing for generating a synthesized image for the plurality of images based on the acquired imaging state information, and generating a synthesized image by synthesizing the plurality of images for which the image processing has been performed is implemented.

According to an embodiment of the present invention, a superior advantage of appropriately generating a synthesized image by using images that are generated in accordance with user's taste for the composition can be acquired.

BRIEF DESCRIPTION OF THE DRAWINGS

FIGS. 4A and 4B are diagrams that schematically represent captured images generated by the imaging unit according to the first embodiment of the present invention in a time series.

FIGS. 6A and 6B are diagrams showing a display example of the display unit and an example of the stored content of the processing information storing unit according to the first embodiment of the present invention.

FIGS. 10A and 10B are an example of a display in the display unit and an example of the stored content of the processing information storing unit according to the first embodiment of the present invention.

FIGS. 13A and 13B are diagrams showing a display example of the display unit and an example of the stored content of a processing information storing unit according to the first embodiment of the present invention.

FIG. 23 is a diagram showing an example of an observed subject and a predetermined operation that become a target for generating a synthesized image by using the imaging apparatus according to the third embodiment of the present invention.

FIG. 26 is a diagram representing an example of the stored content of the processing information storing unit according to the third embodiment of the present invention.

FIGS. 28A and 28B are diagrams schematically representing the flow of generation of a synthesized image by using the imaging apparatus according to the third embodiment of the present invention.

DESCRIPTION OF THE PREFERRED EMBODIMENTS

Hereinafter, embodiments of the present invention (hereinafter, referred to as the embodiments) will be described. The description will be presented in the following order.

1. First Embodiment (Synthetic Image Generation Control: Example In Which Image Processing Process Is Performed Based On Imaging Operation State Designated By User Operation)

2. Second Embodiment (Synthetic Image Generation Control: Example In Which Image Processing Process Is Performed Based On Imaging Operation State Acquired By Imaging Apparatus)

3. Third Embodiment (Synthetic Image Generation Control: Example In Which Image Processing Process Is Performed Based On Imaging Operation State Designated By User Operation and Predetermined Operation Of Observed Subject)

4. Fourth Embodiment (Synthetic Image Generation Control: Example Applied to Cellular Phone Device)

1. First Example

Configuration Example of Imaging Apparatus

Figure 1:
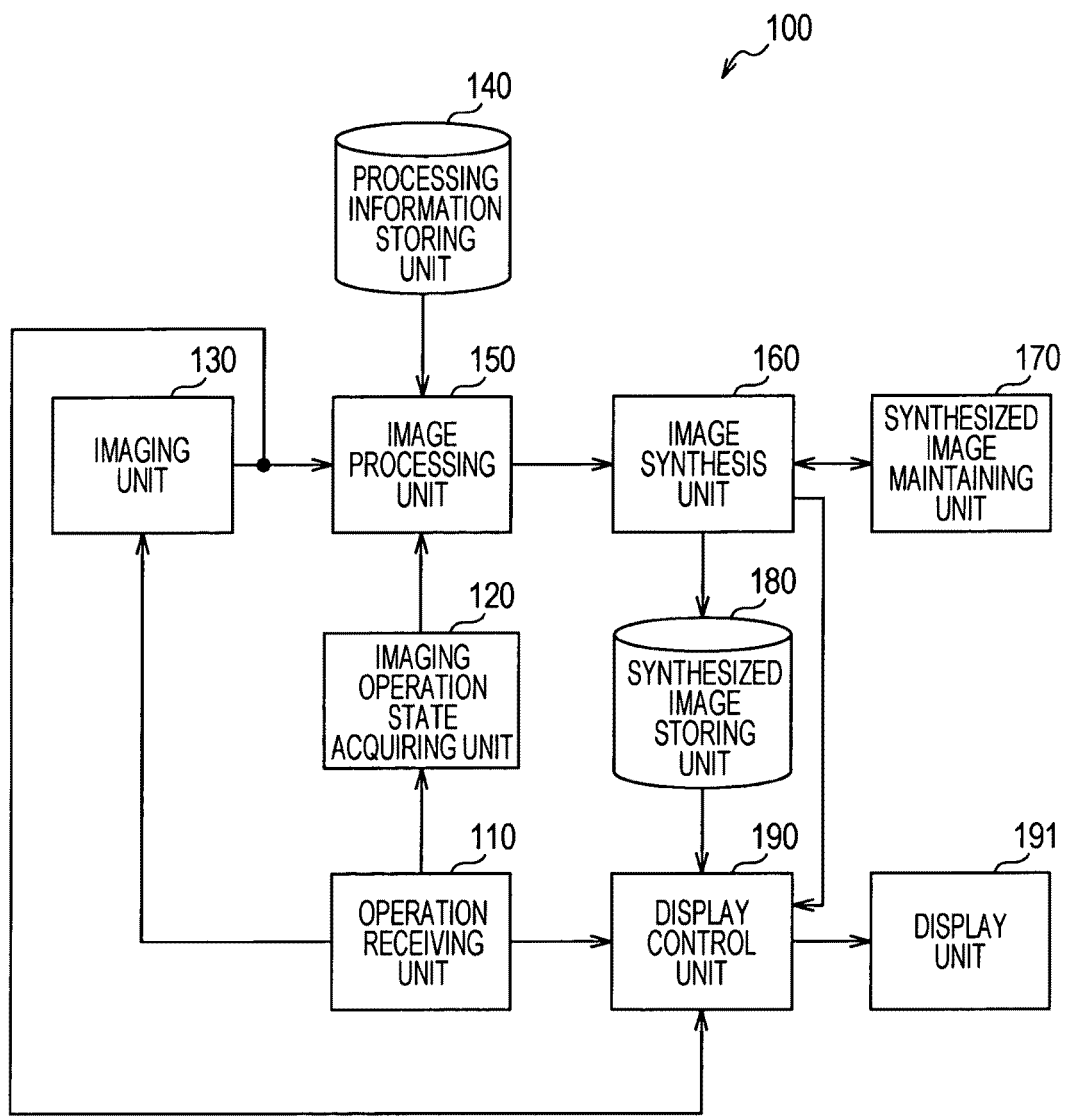
FIG. 1 is a block diagram representing a functional configuration example of an imaging apparatus according to the first embodiment of the present invention.

FIG. 1 is a block diagram representing a functional configuration example of an imaging apparatus 100 according to the first embodiment of the present invention. The imaging apparatus 100 includes an operation receiving unit 110, an imaging operation state acquiring unit 120, an imaging unit 130, a processing information storing unit 140, an image processing unit 150, an image synthesis unit 160, a synthesized image maintaining unit 170, a synthesized image storing unit 180, a display control unit 190, and a display unit 191. The imaging apparatus 100, for example, can be implemented by a digital video camera that can perform consecutive imaging operations (consecutive shooting operations) in which data of a plurality of images is consecutively generated. The imaging apparatus 100 is an example of an image processing apparatus according to an embodiment of the present invention.

The operation receiving unit 110 is an operation receiving unit that receives the content of an operation operated by a user and outputs an operation signal corresponding to the content of the received operation to the imaging operation state acquiring unit 120, the imaging unit 130, or the display control unit 190. For example, when receiving an operation of setting a synthesized image recording mode that is used for generating a synthesized image, the operation receiving unit 110 outputs a control signal for directing setting of the synthesized image recording mode to the imaging unit 130. Then, the operation receiving unit 110 outputs a control signal used for directing the start of display of a captured image to the display control unit 190. The operation of setting the synthesized image recording mode, for example, is performed by pressing down a button for setting the synthesized image recording mode. For example, in a case where the synthesized image recording mode is set, when receiving a start directing operation that directs for the start of an imaging operation, the operation receiving unit 110 outputs a control signal used for directing the start of consecutive imaging operations to the imaging unit 130. On the other hand, for example, when receiving a designation operation for designating an imaging operation state, the operation receiving unit 110 outputs a control signal representing the type of the designated imaging operation state to the imaging operation state acquiring unit 120. Furthermore, when receiving a direction operation for displaying a synthesized image, the operation receiving unit 110 outputs a control signal used for directing the display of the synthesized image to the display control unit 190. Such an operation input, for example, may be performed by using an operation member such as a button disposed on the imaging apparatus 100 or may be performed through wireless communication by the operation of a remote control (remote controller) or the like.

Figure 2A:
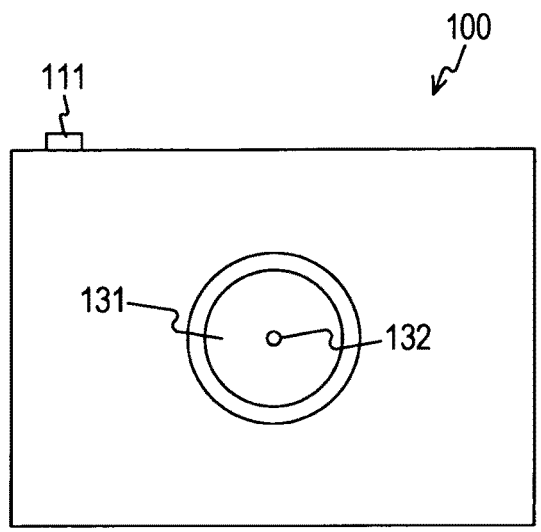
FIGS. 2A and 2B are diagrams representing a configuration example of the outer appearance of the imaging apparatus according to the first embodiment of the present invention.
Figure 2B:
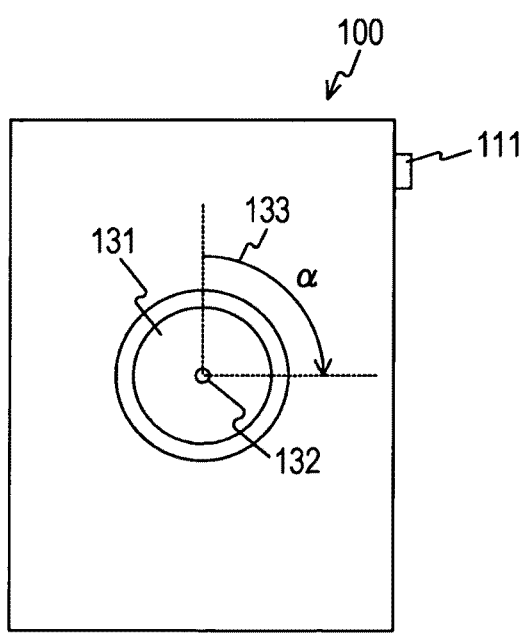

The imaging operation state acquiring unit 120 acquires the state of the imaging apparatus 100 (the imaging operation state) at the time of an imaging operation and maintains the information (imaging operation state information) that represents the acquired imaging operation state. This imaging operation state information, as shown in FIGS. 2A and 2B, is information that represents the rotation angle of the imaging apparatus 100 with the optical axis of the imaging apparatus 100 being set as the center of the rotation. For example, information of 0 degrees (horizontal shooting) or information of 90 degrees (vertical shooting) is maintained. In other words, the imaging operation state information is information that represents the rotation angle of the imaging apparatus 100 with the imaging direction thereof at the time of an imaging operation set as the axis. Then, the imaging operation state acquiring unit 120 supplies the maintained imaging operation state information to the image processing unit 150.

The imaging unit 130 includes an imaging device (not shown) that converts light of a subject, which is incident through a lens (for example, a lens 131 shown in FIG. 2), into an electric signal and a signal processing section (not shown) that processes an output signal of the imaging device and generates a captured image (image data). In other words, in the imaging unit 130, an optical image of a subject that is incident through a lens is imaged on the imaging surface of the imaging device, and in this state, the imaging device performs an imaging operation. Then, the signal processing section performs a signal process for an imaging signal, whereby a captured image is generated. The generation of the captured image is performed based on the start direction information of the imaging operation that is output from the operation receiving unit 110. Then, the generated captured image is supplied to the image processing unit 150, and predetermined image processing is performed for the captured image. In addition, the generated captured image is supplied to the display control unit 190 and is displayed in the display unit 191.

In a case where a synthesis target image recording mode is set, the imaging unit 130 performs consecutive imaging operations. The consecutive imaging operations are imaging operations for generating a predetermined number of captured images by consecutively performing a captured image generating process at an imaging interval set in advance or an imaging interval set by a user.

The processing information storing unit 140 stores information (processing information) used for a processing process of the image processing unit 150 for the synthesis target image therein and supplies the stored processing information to the image processing unit 150. The stored content of the processing information storing unit 140 will be described in detail with reference to FIG. 6B.

The image processing unit 150 performs various processing processes for the captured images supplied from the imaging unit 130 so as to be used as a synthesized image based on the imaging operation state information maintained in the imaging operation state acquiring unit 120. In particular, the image processing unit 150 performs a processing process for the captured images supplied from the imaging unit 130 based on the processing information associated with the imaging operation state information maintained in the imaging operation state acquiring unit 120 out of the processing information stored in the processing information storing unit 140. As this processing process, a geometric calculation process such as a cut-out process, an enlargement/contraction process, a rotation process, or a coordinate moving process is performed. Then, the image processing unit 150 outputs an image (the synthesis target image) for which the processing process has been performed to an image synthesis unit 160.

The processing process performed by the image processing unit 150 will be described in detail with reference to FIGS. 7A to 7C and 8A to 8C.

The image synthesis unit 160 generates a synthesized image by performing an image synthesizing process for the synthesis target images output from the image processing unit 150 and stores the generated synthesized image in the synthesized image storing unit 180. In particular, the image synthesis unit 160 synthesizes the synthesis target images such that the synthesis target images output from the image processing unit 150 are disposed in a pixel range to be applied. In addition, after performing a synthesis process for the synthesis target images that become the synthesis target immediately prior to the process, the image synthesis unit 160 sequentially maintains the synthesized image (the history image) in the synthesized image maintaining unit 170. Then, in order to perform a synthesis process for synthesis target images that become the next synthesis targets, the image synthesis unit 160 acquires the synthesized image (the history image), which is maintained in the synthesized image maintaining unit 170, from the synthesized image maintaining unit 170 and uses the synthesized image for a synthesis process. In addition, in a case where display of the synthesized image that is in the middle of a generation process is set, after performing the synthesis process for the synthesis target images, the image synthesis unit 160 sequentially supplies the synthesized images (the history images) to the display control unit 190. Accordingly, the synthesized images (the history images) are sequentially displayed in the display unit 191. The image synthesizing process performed by the image synthesis unit 160 will be described in detail with reference to FIGS. 5A to 5C, 7A to 7C, and 8A to 8C.

The synthesized image maintaining unit 170 sequentially maintains the synthesized images (the history images) that are generated in the image synthesizing process by the image synthesis unit 160 and supplies the maintained synthesized images to the image synthesis unit 160. In other words, when the image synthesizing process is performed by the image synthesis unit 160, the synthesized images that are in the middle of the generation process are sequentially updated and maintained in the synthesized image maintaining unit 170.

The synthesized image storing unit 180 stores the synthesized images generated by the image synthesis unit 160 and supplies the stored synthesized image to the display control unit 190. In other words, when the image synthesizing process performed by the image synthesis unit 160 is completed, the generated synthesized image is stored in the synthesized image storing unit 180.

The display control unit 190 displays the synthesized image stored in the synthesized image storing unit 180 or the captured image output from the imaging unit 130 in the display unit 191 in accordance with the operation input received by the operation receiving unit 110. In addition, the display control unit 190 displays a display screen (for example, a screen 200 designating an imaging operation state that is shown in FIG. 6A) used for performing each operation in the display unit 191 in accordance with the operation input received by the operation receiving unit 110.

The display unit 191 displays each image based on the control of the display control unit 190. As the display unit 191, for example, an LCD (Liquid Crystal Display), an organic EL (Electro Luminescence) panel, or the like may be used.

Configuration Example of Outer Appearance of Imaging Apparatus and Example of Imaging Operation State FIGS. 2A and 2B are diagrams representing a configuration example of the outer appearance of the imaging apparatus 100 according to the first embodiment of the present invention. FIGS. 2A and 2B represent a simplified configuration example of the outer appearance of the front (that is, a lens surface facing a subject) side of the imaging apparatus 100. FIG. 2A represents an example (so-called horizontal shooting) of an imaging operation state in a case where photographing is performed by using the imaging apparatus 100. FIG. 2B represents another example (so-called vertical shooting) of an imaging operation state in a case where photographing is performed by using the imaging apparatus 100. Here, for convenience of the description, the outer appearance of the imaging apparatus represented in the first embodiment of the present invention is shown in a simplified manner. For example, on the outer face of the imaging apparatus 100, an operation member such as a power switch is included but is not shown in the figure, and the description thereof will be omitted.

The imaging apparatus 100 includes a shutter button (release button) 111 and a lens 131. The shutter button 111 corresponds to the operation receiving unit 110 shown in FIG. 1, and the lens 131 corresponds to the imaging unit 130 shown in FIG. 1.

The shutter button ill is a button that is pressed down when image data generated by the imaging unit 130 is recorded on a recording medium (not shown) as a still-image file. In a case where the synthesized image recording mode is set, when the shutter button 111 is pressed down, a control signal directing generation of captured images (a plurality of images that are consecutive in a time series) used for generating a synthesized image is supplied to the imaging unit 130. When this control signal is supplied, the imaging unit 130 starts consecutive imaging operations. Then, a plurality of images generated by the consecutive imaging operation of the imaging unit 130 are sequentially supplied to the image processing unit 150.

The lens 131 is a lens that collects external light, and incident light is supplied to an imaging device of the imaging unit 130 through a zoom lens and a focus lens.

Here, a case where photographing is performed by using the imaging apparatus 100 will be described. For example, in a case where photographing is performed by using the imaging apparatus 100, as shown in FIG. 2A, photographing (so-called horizontal shooting) for which the imaging range is horizontally long or photographing (so-called vertical shooting) for which the imaging range is vertically long are frequently performed, as shown in FIG. 2B. In other words, as shown in FIG. 2A, in a case where photographing for which the imaging range is horizontally long is performed, the vertical direction of the imaging apparatus 100 and the vertical direction of a photographer become the same. In contrast, as shown in FIG. 2B, in a case where photographing for which the imaging range is vertically long is performed, the photographing is performed, for example, in the state in which the imaging apparatus 100 shown in FIG. 2A is rotated by a degrees (for example, 90 degrees) in the direction of an arrow 133 with the optical axis 132 used as the rotation axis. Examples of a captured image generated in a plurality of imaging operation states are shown in FIGS. 4A and 4B.

Example of Generation of Synthesized Image

Next, an example of transition of the generation process for a case where a synthesized image is generated will be represented in a simplified manner.

Figure 3A:
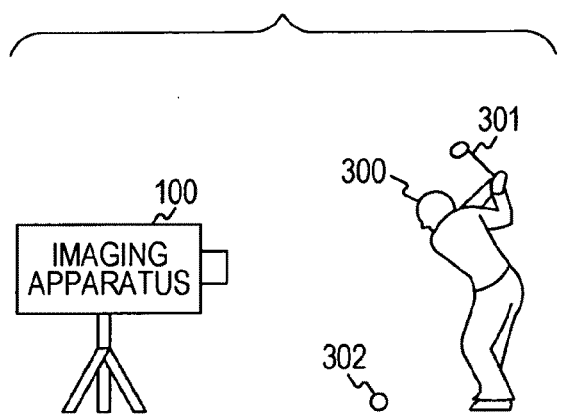
FIGS. 3A and 3B schematically represent the appearance of photographing performed by using the imaging apparatus according to the first embodiment of the present invention and the transition in a person's operation to be photographed.
Figure 3B:
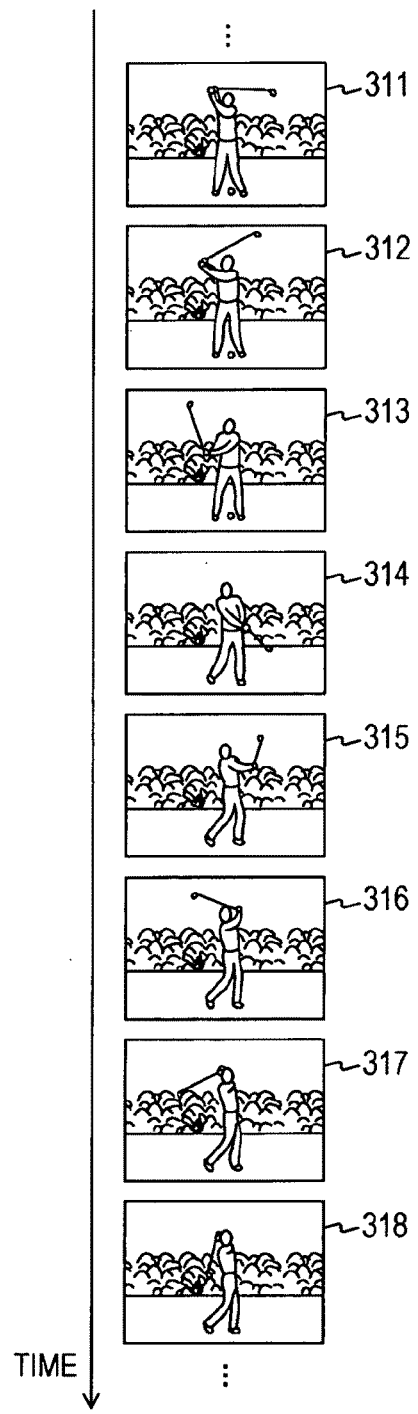

FIGS. 3A and 3B schematically represent the appearance of photographing performed by using the imaging apparatus 100 according to the first embodiment of the present invention and the transition in a person's operation to be photographed.

FIG. 3A schematically represents the positional relationship between the imaging apparatus 100 and a person 300 to be photographed by the imaging apparatus 100. The person 300 is a person who practices swinging a golf club 301, for example, in a golf driving range. The person 300 hits a golf ball 302 a long way in a desired direction by swinging a golf club 301 from the posture shown in FIG. 3A so as to hit the golf ball 302 with the golf club 301.

FIG. 3B schematically represents the transition in the operation of the person 300. Images 311 to 318 are an image group that represents the appearance of a golf swing practice made by the person 300 in the state shown in FIG. 3A in a time series. FIG. 3B represents the images 311 to 318 that are aligned along the time axis. For example, it is assumed that the image 311 is an image at the time of start of a golf swing made by the person 300, and the image 318 is an image at the time of completion of the golf swing made by the person 300. In addition, the images 312 to 317 are images that represent the transition in the operation of the person 300 who makes a golf swing between the image 311 and the image 318.

Example of Generation of Captured Image

FIGS. 4A and 4B are diagrams that schematically represent captured images generated by the imaging unit 130 according to the first embodiment of the present invention in a time series. FIG. 4A schematically represents captured images 331 to 334 (an image group 330), which are generated by the imaging unit 130 in the imaging operation state (so-called "horizontal shooting") of the imaging apparatus 100 shown in FIG. 2A, in rectangles. FIG. 4B schematically represents captured images 341 to 344 (an image group 340), which are generated by the imaging unit 130 in the imaging operation state (so-called "vertical shooting") of the imaging apparatus 100 shown in FIG. 2B, in rectangles.

In addition, the captured images 331 and 341 correspond to the image 311 shown in FIG. 3B, and the captured images 332 and 342 correspond to the image 312 shown in FIG. 3B. In addition, the captured images 333 and 343 correspond to the image 313 shown in FIG. 3B, and the captured images 334 and 344 correspond to the image 314 shown in FIG. 3B.

Here, it is assumed that the length (horizontal width) of the captured image in the horizontal direction (leftward/rightward direction) generated by the imaging unit 130 is W1, and the length (vertical width) of the captured image in the vertical direction (upward/downward direction) is H1. For example, the image size of the captured image that is generated by the imaging unit 130 can be set to a VGA size (640 pixels×480 pixels). In other words, the lengths can be set such that W1=640 and H1=480.

Next, an example in which a synthesized image is generated by using a plurality of images generated by the consecutive imaging operation of the imaging unit 130 will be described. In this example, a case where a synthesized image of still images is generated by using eight images generated by a consecutive imaging operation will be described as an example. In the first embodiment of the present invention, an example in which a synthesized image relating to the transition in the operation of a person making a golf swing is generated as the synthesized image is represented.

Example of Generation of Synthesized Image

Figure 5A:
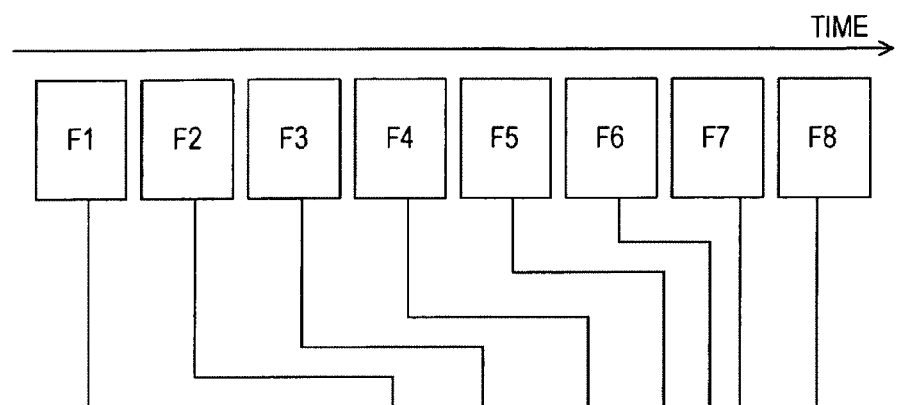
FIGS. 5A and 5C are schematic diagrams showing an example of the flow of a synthesized image generating process performed by the image synthesis unit according to the first embodiment of the present invention.
Figure 5B:
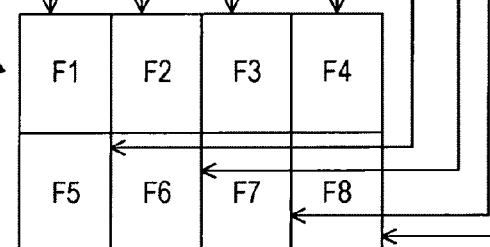
Figure 5C:
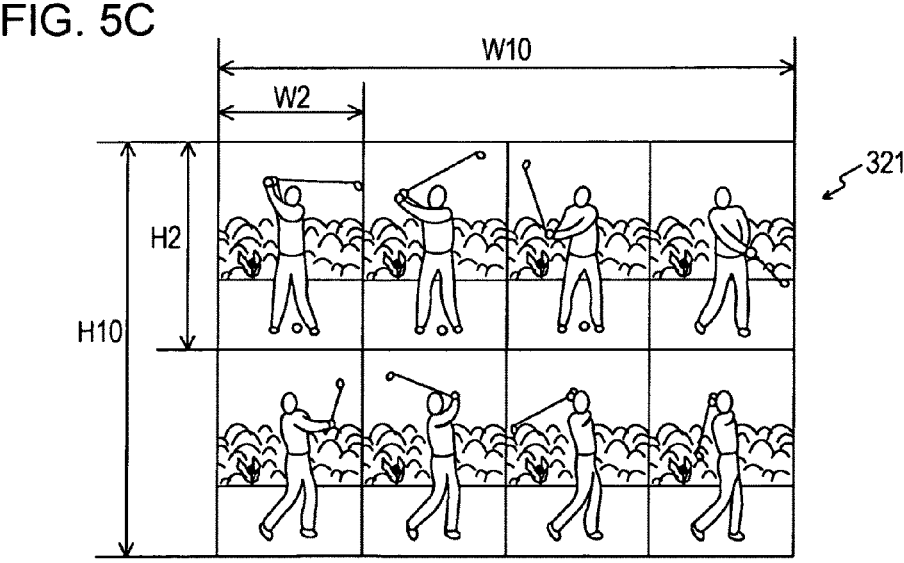

FIGS. 5A and 5C are schematic diagrams showing an example of the flow of a synthesized image generating process performed by the image synthesis unit 160 according to the first embodiment of the present invention.

FIG. 5A schematically shows captured images (frames) F1 to F8 that are generated by the imaging unit 130. FIGS. 5A and 5B represent the captured images F1 to F8 generated by the imaging unit 130 in rectangles, and reference signs (F1 to F8) representing the captured images are added in the rectangles.

FIG. 5B schematically shows a synthesized image 320 that is generated based on the synthesis target images (the captured images F1 to F8). In FIG. 5B, similarly to FIG. 5A, the synthesis target images are represented in the rectangles, and the reference signs (F1 to F8) representing the synthesis target images are added in the rectangles.

The image processing unit 150 performs a processing process (for example, a cut-out process for both end portions), which is performed for synthesis, for the captured images F1 to F8 generated by the imaging unit 130. Then, the image synthesis unit 160 generates a synthesized image 320 by synthesizing the synthesis target images F1 to F8 for which the processing process has been performed by the image processing unit 150. For example, the image synthesis unit 160 synthesizes the synthesis target images F1 to F8, for which the processing process has been performed by the image processing unit 150, so as to be aligned in a time series. For example, four synthesis target images F1 to F4 are synthesized so as to be aligned in a time series from the left end portion of the upper portion, and four synthesis target images F5 to F8 are synthesized so as to be aligned in a time series from the left end portion of the lower portion. In addition, the synthesis positions of the synthesis target images, for example, are determined based on the order of generation in the consecutive imaging operation of the imaging unit 130.

Accordingly, for example, as shown in FIG. 5C, a synthesized image 321 that represents the transition in the operation of the person who practices a golf swing is generated.

FIG. 5C shows the synthesized image 321 that is generated by the image synthesis unit 160 in a simplified manner. The synthesized image 321 is a synthesized image that is generated by using captured images corresponding to the images 311 to 318 shown in FIG. 4B. Here, it is assumed that the length (horizontal width) of each synthesis target image configuring the synthesized image 321 in the horizontal direction (the leftward/rightward direction) is W2, and the length (vertical width) of each synthesis target image in the vertical direction (upward/downward direction) is H2. In addition, it is assumed that the width (horizontal width) of the synthesized image 321 in the horizontal direction (leftward/rightward direction) is W10, and the length (vertical width) of the synthesized image 321 in the vertical direction (upward/downward direction) is H10. In other words, W10=W2×4, and H10=H2×2.

Here, as described above, as the imaging operation state that is formed by using the imaging apparatus 100, a plurality of imaging operation states (for example, the "horizontal shooting" and the "vertical shooting" shown in FIG. 2) are assumed. As shown in FIGS. 4A and 4B, even in a case where the same subject is imaged, when the imaging operation state is different, the position of the subject included in a captured image becomes different. For example, a case where a generation process in which a synthesized image is generated by using the image group 330 shown in FIG. 4A, and a generation process in which a synthesized image is generated by using the image group 340 shown in FIG. 4B are the same generation process will be considered. In such a case, the direction of a person included in any one of the synthesized images is the horizontal direction, and there is a concern that it is difficult to precisely acquire the transition in the operation. Accordingly, for example, in a case where a synthesized image is generated by using generated captured images, it is necessary to consider the direction of the subject in accordance with the imaging operation state. Thus, in the first embodiment of the present invention, an example in which the imaging operation state at the time of generation of captured images is acquired, and an appropriately synthesized image is generated by performing a processing process for the captured images based on the acquired imaging operation state is shown.

Example of Display of Imaging Operation State Designating Screen and Example of Storage of Processing Information Storing Unit FIGS. 6A and 6B are diagrams showing a display example (the imaging operation state designating screen 200) of the display unit 191 and an example of the stored content of the processing information storing unit 140 according to the first embodiment of the present invention.

FIG. 6A shows an imaging operation state designating screen 200 that is used for designating an imaging operation state. On the imaging operation state designating screen 200, a "horizontal shooting" button 201, a "vertical shooting" button 202, a back button 203, and a determination button 204 are disposed.

The "horizontal shooting" button 201, or the "vertical shooting" button 202 is a button that is used for designating an imaging operation state when an image configuring a synthesized image relating to the transition in the operation is imaged. For example, in a case where the display unit 191 is configured by a touch panel, an imaging operation state can be designated by pressing down a desired button. For example, when photographing is performed in the imaging apparatus 100 state (so-called "horizontal shooting) shown in FIG. 2A, the "horizontal shooting" button 201 is pressed down. On the other hand, for example, when photographing is performed in the imaging apparatus 100 state (so-called "vertical shooting) shown in FIG. 2B, the "vertical shooting" button 202 is pressed down.

The determination button 204 is a button that is pressed down when designation is to be determined after a pressing-down operation designating the imaging operation state is performed. The back button 203, for example, is a button that is pressed down so as to return to a display screen that is displayed immediately prior to the current display screen.

FIG. 6B schematically shows an example of the stored content of the processing information storing unit 140. In the processing information storing unit 140, a rotation angle 143, an aspect ratio 144 of a synthesis target image, and the size 145 of the synthesis target image are stored as being associated with the horizontal shooting 141 or the vertical shooting 142. Here, the horizontal shooting 141 corresponds to the imaging operation state shown in FIG. 2A, and the vertical shooting 142 corresponds to the imaging operation state shown in FIG. 2B.

In the rotation angle 143, the rotation angle with respect to the imaging operation state shown in FIG. 2A as a reference is stored. For example, "0 degrees" is stored as being associated with the horizontal shooting 141, and "90 degrees" is stored as being associated with the vertical shooting 142.

In the aspect ratio 144 of the synthesis target image, the aspect ratio of the synthesis target image is stored. Here, the aspect ratio is a value representing a ratio of the vertical length (the number of pixels) to the horizontal length (the number of pixels) of an image. For example, when a person performs a golf swing, the swing is performed in a standing state, and there is hardly an amount of movement in the horizontal direction. Accordingly, for example, as the aspect ratio of the synthesis target image, a value (for example, an aspect ratio of "3:4") that becomes a relatively vertically long is stored.

In the size 145 of the synthesis target image, the size of the synthesis target image is stored. This size is determined based on the size of the synthesized image, the number of synthesis target images configuring the synthesized image, the aspect ratio of the synthesis target image, and the like.

Here, for example, a case where, on the imaging operation state designating screen 200 shown in FIG. 6A, a desired button (for example, the "horizontal shooting" button 201) is pressed down, and the determination button 204 is pressed down will be considered. In such a case, an operation signal indicative of such an operation is output from the operation receiving unit 110 to the imaging operation state acquiring unit 120, and the imaging operation state acquiring unit 120 maintains imaging operation state information (the horizontal shooting) that represents the designated imaging operation state. Then, the image processing unit 150 performs each processing process for the image that is supplied from the imaging unit 130 based on the processing information (horizontal shooting 141) stored in the processing information storing unit 140 in association with the imaging operation state information (horizontal shooting 141) that is maintained in the imaging operation state acquiring unit 120. This processing process will be described in detail with reference to FIGS. 7A to 7C and 8A to 8C.

Example of Generation of Synthesized Image on Basis of Imaging Operation State

FIGS. 7A to 7C and FIGS. 8A to 8C are schematic diagrams showing an example of the flow of a captured image processing process, which is performed by the image processing unit 150, and a synthesized image generating process, which is performed by the image synthesis unit 160, according to the first embodiment of the present invention. In the example shown in FIGS. 7A to 7C, an example of the captured image processing process and the synthesized image generating process in a case where the "horizontal shooting" button 201 is pressed down and the determination button 204 is pressed down on the imaging operation state designating screen 200 shown in FIG. 6A is shown.

Figure 7A:
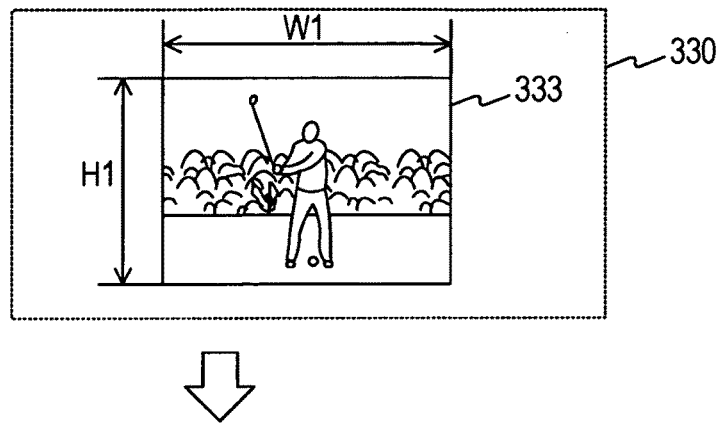
FIGS. 7A to 7C are schematic diagrams showing an example of the flow of a captured image processing process, which is performed by the image processing unit, and a synthesized image generating process, which is performed by the image synthesis unit, according to the first embodiment of the present invention.

FIG. 7A schematically shows a captured image 333 that is generated by the imaging unit 130 in a rectangle. This captured image 333 is assumed to be the same as the captured image 333 that is shown in FIG. 4A. In addition, other captured images (the captured images 331, 332, and 334 to 336, and the like) included in the image group 330 shown in FIG. 4A are not shown in the figure, and the description thereof is omitted.

Figure 7B:
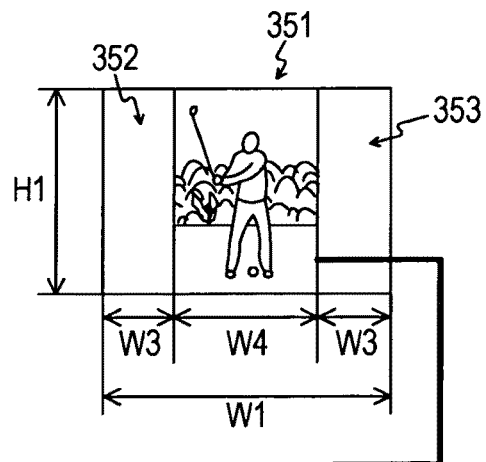

FIG. 7B schematically shows the flow of the processing process performed by the image processing unit 150. The captured image 333 that becomes a target of the processing process, as described above, has an image size of a horizontal width W1 and a vertical width H1. Since a person standing in the vertical direction is included in the captured image 333, a rotation process is not performed. In a case where the person included in the captured image 333 is used as a reference, while the captured image 333 is horizontally long, the size of each synthesis target image configuring the synthesized image is vertically long. Accordingly, for the captured image 333, a cut-out process and an enlargement/contraction process (or only a cut-out process) are necessarily performed.

In other words, the image processing unit 150 performs a cut-out process and an enlargement/contraction process (or only a cut-out process) for the captured image 333 based on the processing information that is stored in the processing information storing unit 140 (shown in FIG. 6B) in association with the "horizontal shooting" 141. For example, the image processing unit 150 performs the cut-out process for the captured image 333, so that the aspect ratio of an image after cut-out of areas of both end portions of the captured image 333 becomes the same as the aspect ratio 144 (shown in FIG. 6B) of the synthesis target image. In addition, the image processing unit 150 performs an enlargement/contraction process for the captured image 333, so that the size of an image after cut-out of areas of both end portion becomes the size 145 (shown in FIG. 6B) of the synthesis target image.

Since the rotation angle 143 (shown in FIG. 6B) that is stored in the processing information storing unit 140 in association with the "horizontal shooting" 141 is "0 degrees", the rotation process is not performed.

In particular, the image processing unit 150 performs a cut-out process in which areas (cut-out areas 352 and 353) of a horizontal width W3 of both end portions of the captured image 333 are cut out so as to allow the captured image to have an image size of a horizontal width W4 and a vertical width H1. In this cut-out process, the center positions of images (the captured image and the image after the cut-out process) before and after the cut-out process are adjusted so as to coincide with each other. Subsequently, the image processing unit 150 performs an enlargement/contraction process, so that the image having the horizontal width W4 and the vertical width H1 is changed to have an image size of a horizontal width W2 and a vertical width H2.

For example, a case where the image size of the captured image 333 that is generated by the imaging unit 130 is a VGA size will be considered (that is, W1=640 and H1=480). In addition, the size of the synthesized image is assumed to have 1440 pixels×960 pixels (that is, W10=1440 and H10=960), and the size of one frame of the synthesized image (the size of the synthesis target image) is assumed to be 360 pixels×480 pixels (that is, W2=360 and H2=480). In such a case, the vertical width H1 of the image size of the captured image is the same as the vertical width H2 of the size of the synthesis target image. Accordingly, the image processing unit 150 performs only the cut-out process in which the areas (cut-out areas 352 and 353) of the horizontal width W3 (140 pixels) of both end portions of the captured image 333 are cut out. In other words, since the image size W4×H1 (360 pixels×480 pixels) after the cut-out process and the size W2×H2 (360 pixels×480 pixels) of one frame of the synthesis target image are the same, the enlargement/contraction process is not performed.

Subsequently, the image synthesis unit 160 performs a synthesis process for the synthesis target image 351 for which the processing process has been performed by the image processing unit 150.

Figure 7C:
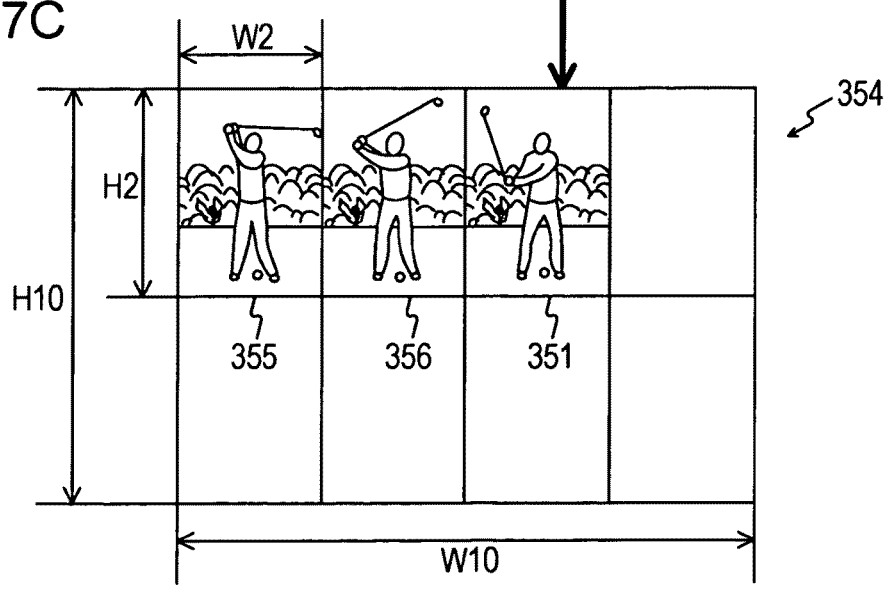

FIG. 7C shows an image (a synthesized images 354) for which the synthesis process has been performed by the image synthesis unit 160 in a simplified manner. In this example, the synthesis states at specific time points until the synthesized image 321 shown in FIG. 5C are generated are shown. For example, the state shown in FIG. 7C is assumed to be at a time point when a synthesis process is performed for the synthesis target image 351 (three synthesis target images 355, 356, and 351). The synthesis target images 355 and 356 are images acquired by performing a processing process for the captured images 331 and 332 shown in FIG. 4A by using the image processing unit 150.

As shown in FIG. 7B, the processing process is performed for the captured image 333 by the image processing unit 150, whereby a synthesis target image 351 is generated. Subsequently, the image synthesis unit 160 synthesizes the synthesis target image 351 to a synthesized image (the synthesis target images 355 and 356) that has been generated in advance, whereby generating a synthesized image 354.

Here, in a case where a synthesized image is generated by sequentially synthesizing three or more synthesis target images, the image synthesis unit 160, as shown in FIG. 7C, generates a synthesized image by sequentially synthesizing the synthesis target images along a time series. In addition, of two synthesis target images that are consecutive in a time series, a synthesis target image that is the former in the time axis is maintained in the synthesized image maintaining unit 170 until a synthesis process of the latter synthesis target image is performed.

As described above, the synthesized image generated by the image synthesis unit 160 is stored in the synthesized image storing unit 180. Then, for example, the synthesized image is displayed in the display unit 191 in accordance with a user's operation. Alternatively, for example, the synthesized image may be configured to be automatically displayed in the display unit 191 each time when the synthesized image is generated by the image synthesis unit 160.

Figure 8A:
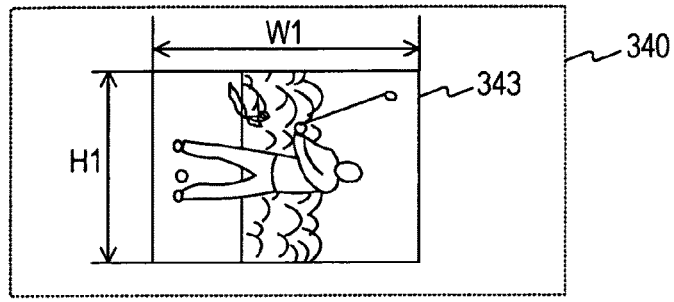
FIGS. 8A to 8C are schematic diagrams showing an example of the flow of a captured image processing process, which is performed by the image processing unit, and a synthesized image generating process, which is performed by the image synthesis unit, according to the first embodiment of the present invention.
Figure 8B:
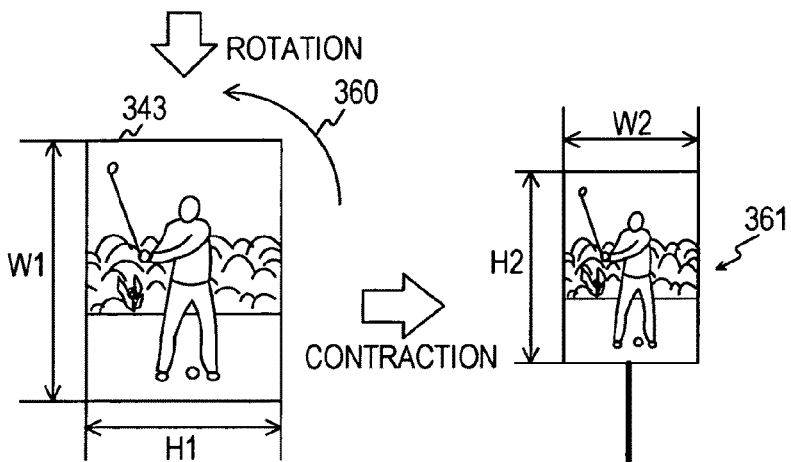
Figure 8C:
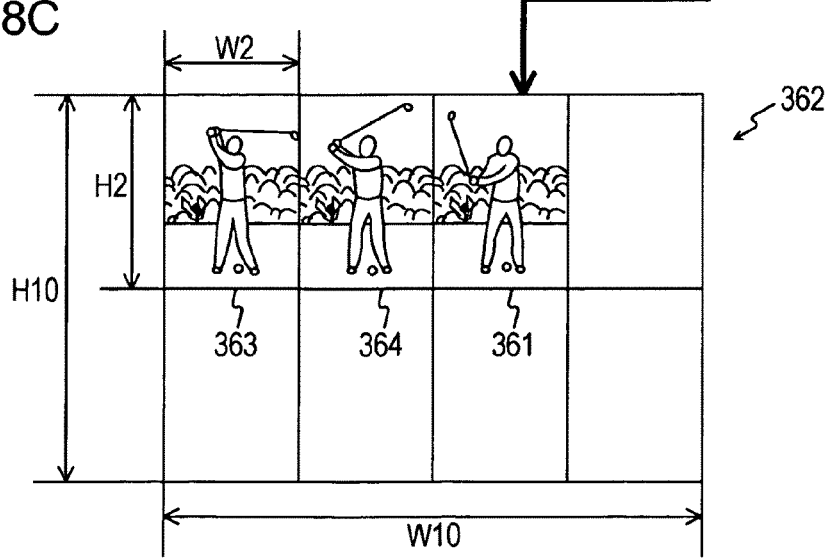

In the example shown in FIGS. 8A to 8C, an example of the captured image processing process and the synthesized image generating process in a case where the "vertical shooting" button 202 is pressed down and the determination button 204 is pressed down on the imaging operation state designating screen 200 shown in FIG. 6A is shown.

FIG. 8A schematically shows a captured image 343 that is generated by the imaging unit 130 in a rectangle. This captured image 343 is assumed to be the same as the captured image 343 that is shown in FIG. 4B. In addition, other captured images (the captured images 341, 342, and 344 to 346, and the like) included in the image group 340 shown in FIG. 4B are not shown in the figure, and the description thereof is omitted.

FIG. 8B schematically shows the flow of the processing process performed by the image processing unit 150. The captured image 343 that becomes a target of the processing process, as described above, has an image size of a horizontal width W1 and a vertical width H1. Since a person standing in the horizontal direction is included in the captured image 343, a rotation process is necessarily performed. In a case where the person included in the captured image 343 is used as a reference, while the captured image 343 is vertically long, the size of each synthesis target image configuring the synthesized image is also vertically long. Accordingly, an area of the captured image 343 cut out by the cut-out process can be smaller than that of the captured image 333 shown in FIG. 7A.

In other words, the image processing unit 150 performs a rotation process for the captured image 343 based on the rotation angle 143 (90 degrees) that is stored in the processing information storing unit 140 (shown in FIG. 6B) in association with the "vertical shooting" 142. In addition, the image processing unit 150 performs a cut-out process and an enlargement/contraction process for the captured image 343 based on another processing information that is stored in the processing information storing unit 140 in association with the "vertical shooting" 142. For example, the image processing unit 150 performs the cut-out process for the captured image 343, so that the aspect ratio of an image after cut-out of predetermined areas becomes the same as the aspect ratio 144 (shown in FIG. 6B) of the synthesis target image. In addition, the image processing unit 150 performs an enlargement/contraction process for the captured image 343, so that the size of an image after cut-out of the predetermined areas becomes the size 145 (shown in FIG. 6B) of the synthesis target image. However, in a case where the size of the captured image 343 after the rotation process is the same as that of the synthesis target image, the cut-out process and the enlargement/contraction process are not performed.

In particular, the image processing unit 150 performs a rotation process so as to rotate the captured image 343 by 90 degrees in the direction of an arrow 360. In addition, the image processing unit 150 performs a cut-out process and an enlargement/contraction process for the captured image 343 so as to allow the captured image 343 after the rotation process to have the size 145 (shown in FIG. 6B) of the synthesis target image.

For example, a case where the image size of the captured image 343 generated by the imaging unit 130, the size of the synthesized image, and the size of one frame of the synthesized image (the size of the synthesis target image) are the same as those of the example shown in FIGS. 7A to 7C will be considered. In other words, a case where W1=640, H1=480, W2=360, H2=480, W10=1440, and H10=960 will be considered.

In such a case, the aspect ratio (H1:W1=3:4) of the captured image 343 after the rotation process is the same as the aspect ratio 144 (3:4) of the synthesis target image. Accordingly, the image processing unit 150 performs only the enlargement/contraction process for the captured image 343 without performing the cut-out process. In other words, the image processing unit 150 performs a contraction process so as to allow the image size H1×W1 (480 pixels×640 pixels) after the rotation process to be the size W2×H2 (360 pixels× 480 pixels) of one frame of the synthesized image, whereby generating the synthesis target image 361.

Subsequently, the image synthesis unit 160 performs a synthesis process for the synthesis target image 361 for which the processing process has been performed by the image processing unit 150.

FIG. 8C shows an image (the synthesis images 362) for which the synthesis process has been performed by the image synthesis unit 160 in a simplified manner. In this example, the synthesis states at specific time points until the synthesized image 321 shown in FIG. 5C is generated are shown. For example, the state shown in FIG. 8C is assumed to be at a time point when a synthesis process is performed for the synthesis target image 361 (three synthesis target images 363, 364, and 361). The synthesis target images 363 and 364 are images acquired by performing a processing process for the captured images 341 and 342 shown in FIG. 4B by using the image processing unit 150.

As shown in FIG. 8B, the processing process is performed for the captured image 343 by the image processing unit 150, whereby a synthesis target image 361 is generated. Subsequently, the image synthesis unit 160 synthesizes the synthesis target image 361 to a synthesized image (the synthesis target images 363 and 364) that has been generated in advance, whereby generating a synthesized image 362.

As described above, the synthesized image generated by the image synthesis unit 160 is stored in the synthesized image storing unit 180. Then, for example, the synthesized image is displayed in the display unit 191 in accordance with a user's operation. Alternatively, for example, the synthesized image may be configured to be automatically displayed in the display unit 191 each time when the synthesized image is generated by the image synthesis unit 160.

Here, a synthesized image that is generated in a case where photographing is performed by horizontal shooting and a synthesized image that is generated in a case where photographing is performed by vertical shooting will be described. For example, in the case where photographing is performed by horizontal shooting, as shown in FIG. 7B, the cut-out areas 352 and 353 (140 pixels×480 pixels×2) of both end portions of the captured image 333 are wasted as unnecessary areas by the processing process. Accordingly, in the case where a synthesized image is generated by performing photographing by horizontal shooting, there is a possibility that it is difficult to effectively use a part of resolution of the captured image generated by the imaging unit 130. For example, in the example shown in FIG. 7B, of the resolution (640 pixels×480 pixels) of the captured image 333 generated by the imaging unit 130, only 360 pixels×480 pixels can be used.

On the other hand, in a case where photographing is performed by vertical shooting, as shown in FIG. 8B, there is hardly an area of the captured image 343 that is wasted as an unnecessary area in the processing process. Accordingly, in a case where a synthesized image is generated by performing photographing by vertical shooting, the resolution of the captured image that is generated by the imaging unit 130 can be effectively used. In other words, a high resolution of the captured image or the imaging device can be sufficiently used. In addition, in a case where images having the same size are generated by resizing an image having a relatively low resolution and an image having relatively high resolution, the image having the relatively high resolution can decrease the noise.

In addition, in the example shown in FIG. 8B, a synthesized image can be generated by sufficiently utilizing the resolution (640 pixels×480 pixels) of the captured image 343 that is generated by the imaging unit 130. Accordingly, photographing can be performed by sufficiently utilizing the imaging range that becomes an imaging target of the imaging unit 130. For example, in a case where imaging is performed for generating a synthesized image, a photographer can perform vertical shooting so as to sufficiently include an observed subject (for example, a golf player) in the imaging range. Accordingly, it is possible to photograph a subject that is vertically long at a relatively short distance (or perform zoom photographing). In addition, for example, when photographing is performed in a golf practice range, photographing is frequently performed in a relatively narrow place. As described above, since the vertical shooting can be performed even in a case where photographing is performed in a relatively narrow place (narrow photographing space), a synthesized image can be generated in an easy manner by using an image that is photographed in accordance with a user's taste for the composition. In addition, in the case where photographing is performed in such a narrow photographing space, the effect can be improved, for example, by performing photographing in combination with a wide conversion lens or the like.

In addition, since an unnecessary area of the captured image, which is used for a synthesized image, can be decreased, waste of resources such as a memory maintaining the captured image or power consumption can be suppressed.

Example of Operation of Imaging Apparatus

Figure 9:
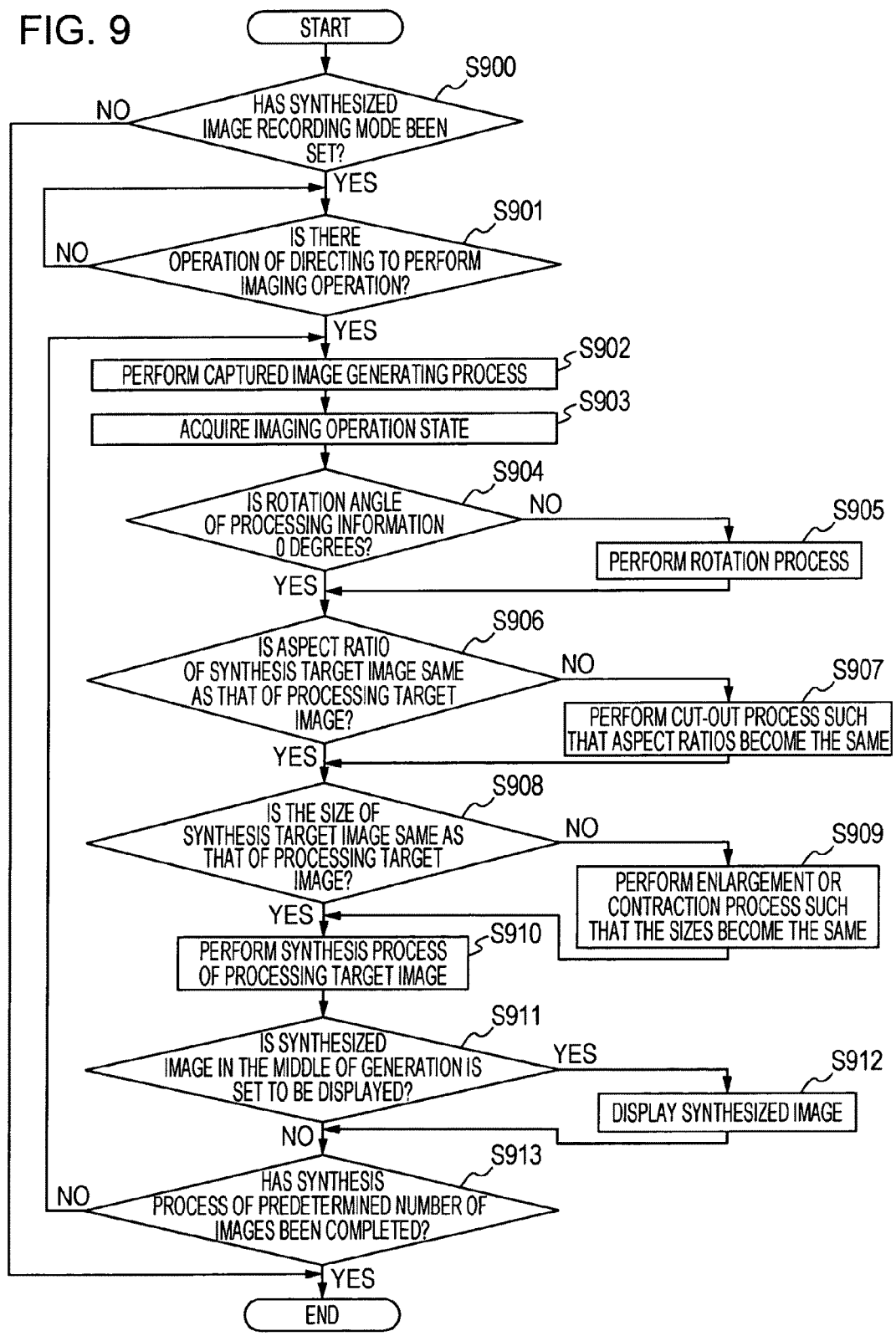
FIG. 9 is a flowchart showing an example of the processing procedure of a synthesized image generating process that is performed by the imaging apparatus according to the first embodiment of the present invention.

FIG. 9 is a flowchart showing an example of the processing procedure of a synthesized image generating process that is performed by the imaging apparatus 100 according to the first embodiment of the present invention. In this example, a case where an imaging operation state is designated by a user, and the designated imaging operation state information is maintained in the imaging operation state acquiring unit 120 will be described as an example.

First, it is determined whether or not the synthesized image recording mode is set (Step S900). When the synthesized image recording mode is not set (Step S900), the operation of the synthesized image generating process is completed. On the other hand, when the synthesized image recording mode is set (Step S900), it is determined whether or not an operation for directing an imaging operation is performed (Step S901). When the operation for directing an imaging operation has not been performed (Step S901), a monitoring operation continues until an operation for direction of an imaging operation is performed.

In addition, when the operation for direction of an imaging operation is performed (Step S901), the imaging unit 130 performs a captured image generating process (Step S902). Then, the generated captured image is set as a process target image.

Subsequently, the image processing unit 150 acquires the imaging operation state information that is maintained in the imaging operation state acquiring unit 120 and acquires the processing information (processing information corresponding to the designated imaging operation state) that is stored in the processing information storing unit 140 in association with the imaging operation state information (Step S903). In this example, an example in which the imaging operation state information and the processing information are acquired each time when captured image is generated is represented. However, it may be configured that the imaging operation state information and the processing information are acquired after the start of an imaging operation is directed (Step S901), and the acquired processing information is maintained by the image processing unit 150 and is used for a processing process. Step S903 is an example of an imaging operation state acquiring process according to an embodiment of the present invention.

Subsequently, the image processing unit 150 performs a processing process based on the acquired processing information (the processing information corresponding to the designated imaging operation state) (Steps S904 to S909). In particular, the image processing unit 150 determines whether or not the rotation angle (the rotation angle 143 shown in FIG. 6B) of the acquired processing information is "0 degrees" (Step S904). Then, in a case where the rotation angle is not "0 degrees" (Step S904), the image processing unit 150 performs a rotation process for the process target image based on the rotation angle of the acquired processing information (Step S905), and the process proceeds to Step S906. On the other hand, in a case where the rotation angle is "0 degrees" (Step S904), the process proceeds to Step S906.

Subsequently, the image processing unit 150 determines whether or not the aspect ratio (the aspect ratio 144 of the synthesis target image shown in FIG. 6B) of the acquired processing information is the same as the aspect ratio of the process target image (Step S906). In a case where the aspect ratios are not the same (Step S906), the image processing unit 150 performs a cut-out process for the process target image so as to allow the aspect ratio of the processing information and the aspect ratio of the captured image to be the same (Step S907), and the process proceeds to Step S908. On the other hand, in a case where the aspect ratio of the processing information is the same as the aspect ratio of the captured image (Step S906), the process proceeds to Step S908.

Subsequently, the image processing unit 150 determines whether or not the size (the size 144 of the synthesis target image shown in FIG. 6B) included in the processing information corresponding to the designated imaging operation state is the same as the size of the process target image (Step S908). In a case where the sizes are not the same (Step S908), the image processing unit 150 performs an enlargement/contraction process for the process target image so as to allow the size included in the processing information and the size of the process target image to be the same (Step S909), and the process proceeds to Step S910. On the other hand, in a case where the size included in the processing information is the same as the size of the process target image (Step S908), the process proceeds to Step S910. In this example, an example in which the processing process is performed in the order of the rotation process, the cut-out process, and the enlargement/contraction process is represented. However, the processing process may be performed with such order being changed. For example, the processing process may be performed in the order of the enlargement/contraction process, the cut-out process, and the rotation process. Here, Steps S904 to S909 are an example of an image processing process according to an embodiment of the present invention.

Subsequently, the image synthesis unit 160 performs an image synthesis process for the process target image for which the processing process has been performed (Step S910). Here, Step S910 is an example of an image synthesis procedure according to an embodiment of the present invention. Subsequently, it is determined whether or not a synthesized image in the middle of the generation process is set to be displayed (Step S911). In a case where the synthesized image in the middle of the generation process is set to be displayed (Step S911), the display control unit 190 displays the synthesized image (the synthesized image in the middle of the generation process) after the synthesis process of the process target image in the display unit 191 (Step S912). On the other hand, when the synthesized image in the middle of the generation process is not set to be displayed (Step S911), the process proceeds to Step S913.

Subsequently, it is determined whether the synthesis process of a predetermined number of process target images has been completed (Step S913). In a case where the synthesis process of the predetermined number of process target images has been completed, the operation of the synthesized image generating process is completed. The synthesized image generated as described above is stored in the synthesized image storing unit 180. In addition, after the operation of the synthesized image generating process is completed, the generated synthesized image may be configured to be automatically displayed in the display unit 191. On the other hand, in a case where the synthesis process of the predetermined number of process target images has not been completed (Step S913), the process returns back to Step S902.

Example of Generating Synthesized Image with Number of Synthesis Target Images being Changed In the description above, an example of generating a synthesized image in a case where the numbers of the synthesis target images configuring the synthesized images are the same is represented. Here, for example, when the transition in the operation of a golf swing is desired to be viewed more finely, a case where the synthesized image is generated with the number of the synthesis target images being increased may be considered. Thus, an example in which a synthesized image is generated with the imaging operation state and the number of synthesis target images being designated by a user's operation is shown below. In this example, an example in which "8" or "10" is designated as the number of synthesis target images is represented.

Example of Display of the Imaging Operation State and Number of Synthesis Target Images in Designated Screen and Example of Storage of Processing Information Storing Unit FIGS. 10A and 10B are an example (designated screen 400) of a display in the display unit 191 and an example of the stored content of the processing information storing unit 410 according to the first embodiment of the present invention.

FIG. 10A shows the designation screen 400 that is used for designating the imaging operation state and the number of the synthesis target images. The designation screen 400 is acquired by changing a part of the imaging operation state designating screen 200 shown in FIG. 6A. Thus, to each portion that is common to the imaging operation state designating screen 200, the same reference sign is assigned, and the description thereof is omitted.

On the designation screen 400, a "horizontal shooting, 8 images" button 401, a "vertical shooting, 8 images" button 402, a "horizontal shooting, 10 images" button 403, and a "vertical shooting, 10 images" button 404, a back button 203, and a determination button 204 are disposed.

The "horizontal shooting, 8 images" button 401 and the "vertical shooting, 8 images" button 402 are buttons corresponding to the "horizontal shooting" button 201 and the "vertical shooting" button 202 that are shown in FIG. 6A and are buttons that are pressed down in a case where "8" is designated as the number of synthesis target images.

The "horizontal shooting, 10 images" button 403 and the "vertical shooting, 10 images" button 404 are buttons that are pressed down in a case where "10" is designated as the number of synthesis target images. In addition, the "horizontal shooting, 10 images" button 403 and the "vertical shooting, 10 images" button 404, similarly to the example shown in FIG. 6A, are pressed down when an imaging operation state is designated in a case where images configuring the synthesized image relating to the transition in the operation are imaged. For example, in a case where photographing is performed in the imaging apparatus 100 state (so-called horizontal shooting) shown in FIG. 2A, the "horizontal shooting, 10 images" button 403 is pressed down. On the other hand, in a case where photographing is performed in the imaging apparatus 100 state (so-called vertical shooting) shown in FIG. 2B, the "vertical shooting, 10 images" button 404 is pressed down.

FIG. 10B schematically shows an example of the stored content of the processing information storing unit 410. The processing information storing unit 410 is acquired by changing a part of the processing information storing unit 140 shown in FIG. 6B. Thus, hereinafter, parts that are different from those of the processing information storing unit 140 will be focused upon in the description, and a part of common parts is omitted in the description.

In the processing information storing unit 410, the rotation angle 415, the aspect ratio 416 of the synthesis target image, and the size 417 of the synthesis target image are stored as being associated with horizontal shooting (8 images) 411, vertical shooting (8 images) 412, horizontal shooting (10 images) 413, and vertical shooting (10 images) 414. Here, the horizontal shooting (8 images) 411 and the horizontal shooting (10 images) 413 correspond to the imaging operation state shown in FIG. 2A. On the other hand, the vertical shooting (8 images) 412 and the vertical shooting (10 images) 414 correspond to the imaging operation state shown in FIG. 2B.

The rotation angle 415, the aspect ratio 416 of the synthesis target image, and the size 417 of the synthesis target image correspond to the rotation angle 143, the aspect ratio 144 of the synthesis target image, and the size 145 of the synthesis target image shown in FIG. 6B. In other words, in the rotation angle 415, the aspect ratio 416 of the synthesis target image, and the size 417 of the synthesis target image corresponding to the horizontal shooting (8 images) 411 and the vertical shooting (8 images) 412, the same information as the processing information shown in FIG. 6B are stored. In addition, in the rotation angle 415, the aspect ratio 416 of the synthesis target image, and the size 417 of the synthesis target image corresponding to the horizontal shooting (10 images) 413 and the vertical shooting (10 images) 414, respective values corresponding to the size of the synthesized image and the number of the synthesis target images are stored.

Example of Generation of Synthesized Image on Basis of Imaging Operation State

Figure 11A:
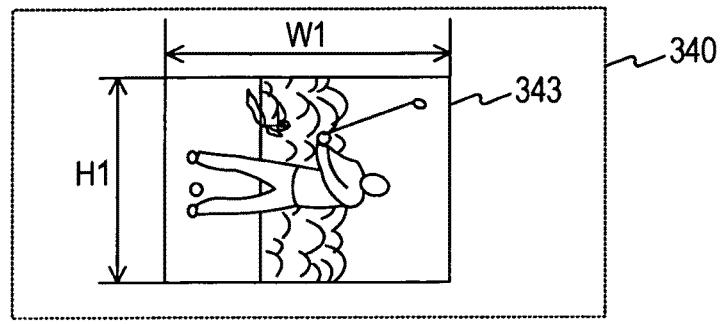
FIGS. 11A to 11C are diagrams schematically showing an example of the flow of the captured image processing process, which is performed by the image processing unit and the synthesized image generating process, which is performed by the image synthesis unit according to the first embodiment of the present invention.
Figure 11B:
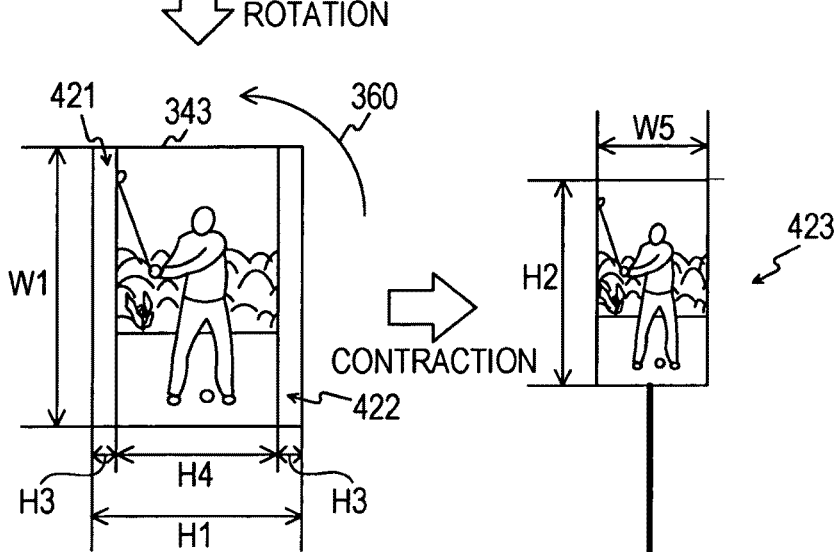
Figure 11C:
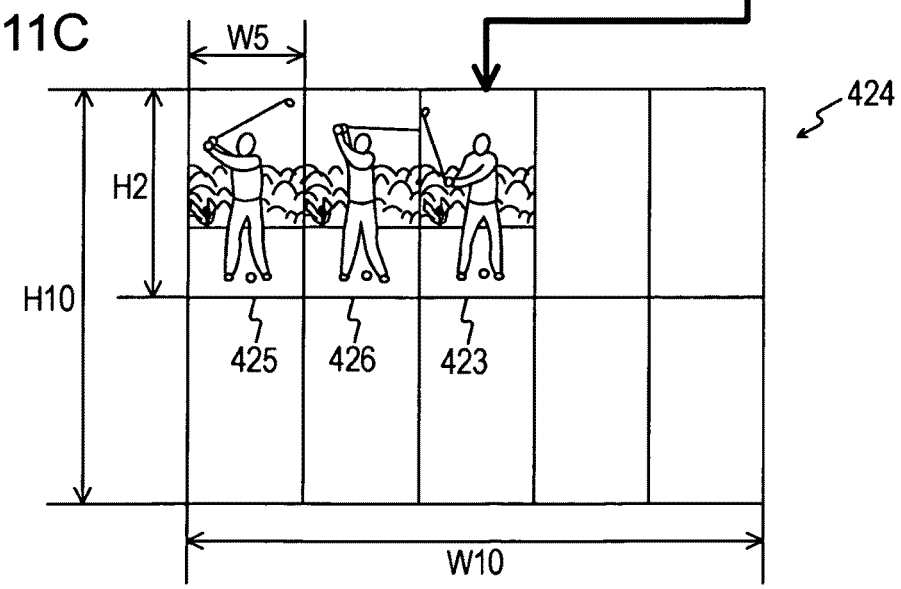

FIGS. 11A to 11C are diagrams schematically showing an example of the flow of the captured image processing process, which is performed by the image processing unit 150, and the synthesized image generating process, which is performed by the image synthesis unit 160 according to the first embodiment of the present invention. This example represents an example of the captured image processing process and the synthesized image generating process in a case where the "vertical shooting, 10 images" button 404 is pressed down, and the determination button 204 is pressed down on the designation screen 400 shown in FIG. 10A. This example is a modified example of the example represented in FIGS. 8A to 8C, and a part of the processing process is different from that of the example represented in FIGS. 8A to 8C. Thus, hereinafter, parts that are different from those of the example represented in FIGS. 8A to 8C will be focused upon in the description, and a part of common parts is omitted in the description. In addition, the captured image processing process and the synthesized image generating process that are performed in a case where the "vertical shooting, 10 images" button 404 is pressed down, and the determination button 204 is pressed down are the same as those represented in FIGS. 7A to 7C except for the range of cut-out areas.

FIG. 11A schematically shows a captured image 343 that is generated by the imaging unit 130 in a rectangle. Similarly to FIG. 8A, this captured image 343 is assumed to be the same as the captured image 343 that is shown in FIG. 4B.

FIG. 11B schematically shows the flow of the processing process performed by the image processing unit 150. A rotation process is the same as that of the example represented in FIG. 8B. In addition, the image processing unit 150 performs a cut-out process and an enlargement/contraction process for the captured image 343 based on another processing information that is stored in the processing information storing unit 410 in association with the "vertical shooting (10 imaged)" 414.

For example, a case where the image size of the captured image 333 that is generated by the imaging unit 130 is a VGA size will be considered (that is, W1=640 and H1=480). In addition, the size of the synthesized image is assumed to have 1440 pixels×960 pixels (that is, W10=1440 and H10=960), and the size of one frame of the synthesized image (the size of the synthesis target image) is assumed to be 288 pixels×480 pixels (that is, W5=288 and H2=480).

In such a case, the aspect ratio (H1:W1=3:4) of the captured image 343 after the rotation process and the aspect ratio 416 (3:5) of the synthesis target image are different from each other. Accordingly, for the captured image 343, the image processing unit 150 performs a cut-out process and further performs an enlargement/contraction process. In other words, the image processing unit 150 performs a cut-out process in which areas (cut-out areas 421 and 422) of the horizontal width H3 (48 pixels) of both end portions of the captured image 343 are cut out. Subsequently, the image processing unit 150 performs a contraction process so as to allow the image size H4×W1 (384 pixels×640 pixels) after the rotation process to be the size W5×H2 (288 pixels×480 pixels) of one frame of the synthesized image, whereby generating a synthesis target image 423.

Subsequently, the image synthesis unit 160 performs a synthesis process for the synthesis target image 361 for which the processing process has been performed by the image processing unit 150.

FIG. 11C shows an image (a synthesized image 424) for which the synthesis process has been performed by the image synthesis unit 160 in a simplified manner. Here, synthesis target images 425 and 426 are images acquired by performing the processing process for the captured images 341 and 342 shown in FIG. 4B by using the image processing unit 150.

As shown in FIG. 11B, the synthesis target image 423 is generated by performing the processing process for the captured image 343 by using the image processing unit 150. Subsequently, the image synthesis unit 160 synthesizes the synthesis target image 423 to a synthesized image (synthesis target images 425 and 426) generated in advance, whereby generating the synthesized image 424.

As above, in the case where the sizes of the synthesized images are the same, and the number of the synthesis target images is changed, the synthesized image can be generated in an easy manner by a user's designation operation.

Here, in a case where the number of the synthesis target images is increased, a cut-out area is generated for any case of the horizontal shooting and the vertical shooting. For example, for the case of the horizontal shooting, in order to allow the size of the synthesis target image to be 288 pixels× 480 pixels, cut-out areas (176 pixels×2) of both end portions are necessarily cut out. In other words, while the area (the area of one image) of the cut-out areas for the case of the vertical shooting becomes 61440 (=48 pixels×640 pixels×2), the area of the cut-out areas for the case of the horizontal shooting becomes 168960 (=176 pixels×480 pixels×2). Accordingly, in a case where a synthesized image is generated by vertical shooting, the cut-out area that is close to three times the cut-out area for the case where a synthesized image is generated by horizontal shooting can be decreased.

Example of Generation of Synthesized Image with Different Imaging Operation State being Designated In the description presented above, an example in which a synthesized image is generated with two types of imaging operation states including the horizontal shooting and the vertical shooting being designated is represented. Here, for example, a case where an imaging operation is performed in the state in which the imaging apparatus 100 is tilted (so-called tilted shooting) may be considered. Thus, hereinafter, an example in which a synthesized image is generated with tilted shooting being designated by a user's operation will be represented.

Examples of Imaging Operation State

Figure 12:
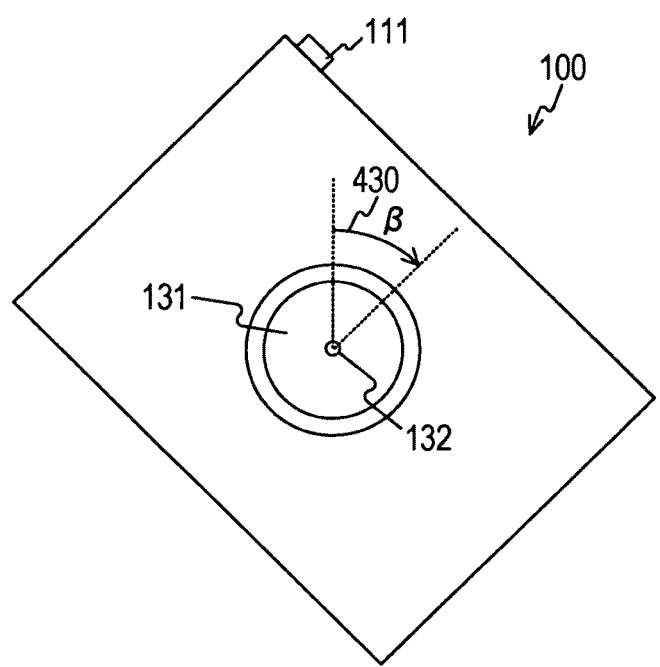
FIG. 12 is a diagram representing a configuration example of the outer appearance of the imaging apparatus according to the first embodiment of the present invention.

FIG. 12 is a diagram representing a configuration example of the outer appearance of the imaging apparatus 100 according to the first embodiment of the present invention. The example represented in FIG. 12 is an example representing an example (so-called tilted shooting) of an imaging operation state in a case where photographing is performed by using the imaging apparatus 100.

Here, in a case where the tilted shooting is performed by using the imaging apparatus 100, for example, as shown in FIG. 12, photographing is performed such that the photographing range is vertically long in a tilted direction. In particular, for example, photographing is performed in the state in which the imaging apparatus 100 shown in FIG. 12 is rotated by β degrees (for example, 40 degrees to 60 degrees) in the direction of an arrow 430 with an optical axis 132 used as its rotation axis.

Example of Display of Imaging Operation State Designating Screen and Example of Storage of Processing Information Storing Unit FIGS. 13A and 13B are diagrams showing a display example (an imaging operation state designating screen 440) of the display unit 191 and an example of the stored content of a processing information storing unit 450 according to the first embodiment of the present invention.

FIG. 13A shows an imaging operation state designation screen 440 that is used for designating an imaging operation state. The imaging operation state designating screen 440 is acquired by modifying a part of the imaging operation state designating screen 200 shown in FIG. 6A. Thus, to each part common to the imaging operation state designating screen 200, the same reference sign is assigned, and the description thereof is omitted.

On the imaging operation state designating screen 440, a "horizontal shooting" button 201, a "vertical shooting" button 202, a "tilted shooting" button 441, a back button 203, and a determination button 204 are disposed.

The "tilted shooting" button 441 is a button that is pressed down when an imaging operation state is designated in a case where an image configuring a synthesized image relating to the transition in the operation is imaged. For example, in a case where photographing is performed in the imaging apparatus 100 state (so-called tilted shooting) shown in FIG. 12, the "tilted shooting" button 441 is pressed down.

FIG. 13B schematically shows an example of the stored content of the processing information storing unit 450. The processing information storing unit 450 is acquired by changing a part of the processing information storing unit 140 shown in FIG. 6B. Thus, hereinafter, parts that are different from those of the processing information storing unit 140 will be focused upon in the description, and a part of common parts is omitted in the description.

In the processing information storing unit 450, the rotation angle 454, the aspect ratio 455 of the synthesis target image, and the size 456 of the synthesis target image are stored as being associated with horizontal shooting 451, vertical shooting 452, and tilted shooting 453. Here, the horizontal shooting 451 and the vertical shooting 452 correspond to the horizontal shooting 141 and the vertical shooting 142 that are shown in FIG. 6B.

The rotation angle 454, the aspect ratio 455 of the synthesis target image, and the size 456 of the synthesis target image correspond to the rotation angle 143, the aspect ratio 144 of the synthesis target image, and the size 145 of the synthesis target image shown in FIG. 6B. In particular, in the rotation angle 454 associated with the tilted shooting 453, the angle (β) at the time when an imaging operation is stored. In addition, the aspect ratio 455 of the synthesis target image and the size 456 of the synthesis target image corresponding to the tilted shooting 453, respective values corresponding to the size of the synthesized image and the number of the synthesis target images are stored.

Example of Generation of Synthesized Image on Basis of Imaging Operation State

Figure 14A:
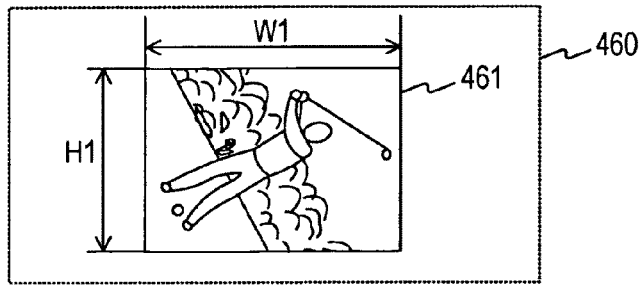
FIGS. 14A to 14C are diagrams schematically showing an example of the flow of the captured image processing process, which is performed by the image processing unit, and the synthesized image generating process, which is performed by the image synthesis unit, according to the first embodiment of the present invention.
Figure 14B:
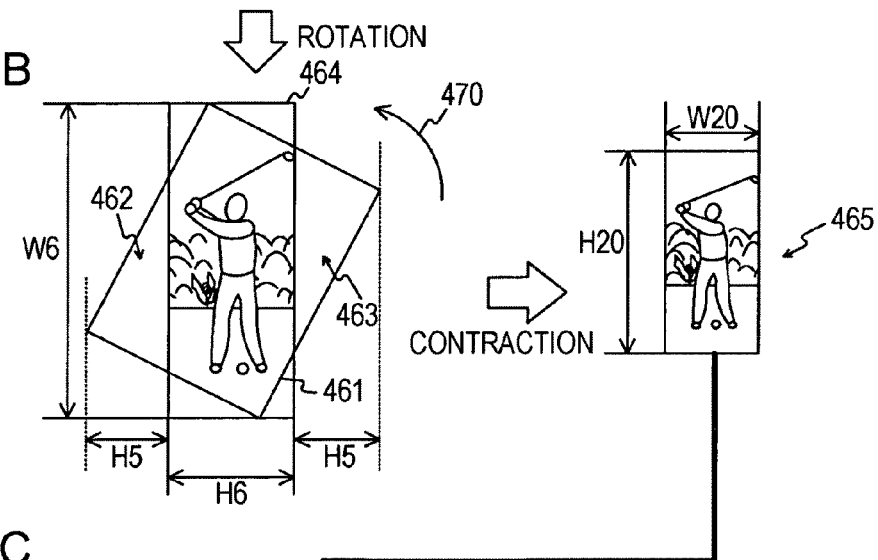
Figure 14C:
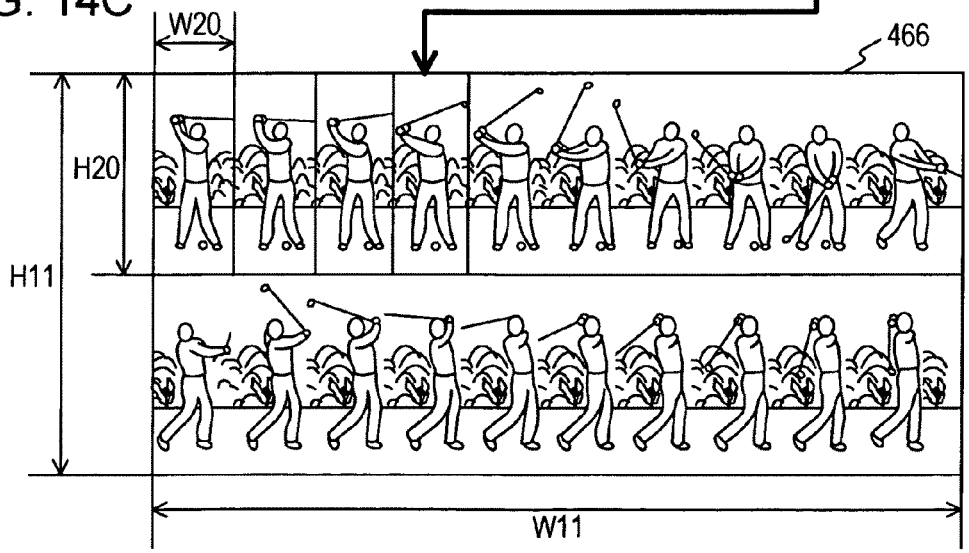

FIGS. 14A to 14C are diagrams schematically showing an example of the flow of the captured image processing process, which is performed by the image processing unit 150, and the synthesized image generating process, which is performed by the image synthesis unit 160, according to the first embodiment of the present invention. This example represents an example of the captured image processing process and the synthesized image generating process in a case where the "tilted shooting" button 401 is pressed down, and the determination button 204 is pressed down on the imaging operation state designating screen 440 shown in FIG. 13A. This example is a modified example of the example represented in FIGS. 11A to 11C, and a part of the processing process is different from that of the example represented in FIGS. 11A to 11C. Thus, hereinafter, parts that are different from those of the example represented in FIGS. 11A to 11C will be focused upon in the description, and a part of common parts is omitted in the description.

FIG. 14A schematically shows a captured image 461 that is generated by the imaging unit 130 in a rectangle. Other captured images (captured images prior to and next to the captured image 461) included in an image group 460 are not shown in the figure, and the description thereof is omitted.

FIG. 14B schematically shows the flow of the processing process performed by the image processing unit 150. The image processing unit 150 performs a rotation process for the captured image 461 based on the rotation angle 454 (β degrees) that is stored in the processing information storing unit 450 (shown in FIG. 13B) in association with the "tilted shooting" 441. In addition, the image processing unit 150 performs a cut-out process and an enlargement/contraction process for the captured image 461 based on another processing information that is stored in the processing information storing unit 450 in association with the "tilted shooting" 441.

In particular, the image processing unit 150 performs a rotation process so as to rotate the captured image 461 by β degrees in the direction of an arrow 470. In addition, the image processing unit 150 performs a cut-out process and an enlargement/contraction process for the captured image 461 after the rotation process so as to allow the captured image 461 after the rotation process to have the size 456 (shown in FIG. 13B) of the synthesis target image. For example, the image processing unit 150 performs a cut-out process in which areas (cut-out areas 462 and 463) of the horizontal width H5 of both end portions of the captured image 461 after the rotation process are cut out. Subsequently, the image processing unit 150 performs a contraction process so as to allow the image size (the size (W6×H6) of the image 464) after the cut-out process to be the size W20×H20 of one frame of the synthesized image, whereby generating a synthesized target image 465.

Subsequently, the image synthesis unit 160 performs a synthesis process for the synthesis target image 465 for which the processing process has been performed by the image processing unit 150.

FIG. 14C shows an image (a synthesized image 466) for which the synthesis process has been performed by the image synthesis unit 160 in a simplified manner. Here, the synthesized image 466 is an image acquired by synthesizing the image for which the processing process has been performed by the image processing unit 150 to other captured images (captured images prior to and next to the captured image 461) included in the image group 460.

As shown in FIG. 14B, the synthesis target image 465 is generated by performing the processing process for the captured image 461 by using the image processing unit 150. Subsequently, the image synthesis unit 160 synthesizes the synthesis target image 465 to the synthesized image generated in advance, whereby generating a synthesized image. Then, by performing the processing process and the synthesis process similarly even for a captured image next to the captured image 461, a synthesized image 466 is generated.

As above, by designating the image operation state (the tilted shooting) other than horizontal shooting and vertical shooting, a synthesized image according to user's taste can be generated in an easy manner. Here, in a case where the synthesized image is generated with the tilted shooting being designated, although a part of the image used as the synthesis target image becomes a cut-out process, compared to the case of the horizontal shooting or the vertical shooting, the resolution that is vertically long can be effectively used.

Modified Example of Image Synthesis

As above, an example in which a synthesized image is generated by performing the processing process for the captured images so as to be the size of the synthesis target image and synthesizing the synthesis target images, for which the processing process has been performed, so as to be aligned has been represented. Hereinafter, an example in which the synthesized image is generated such that parts of adjacent synthesis target images overlap with each other will be represented. In other words, an example in which a synthesized image is generated by classifying the synthesis target image into a observed subject layer and a background layer will be represented.

Configuration Example of Imaging Apparatus

Figure 15:
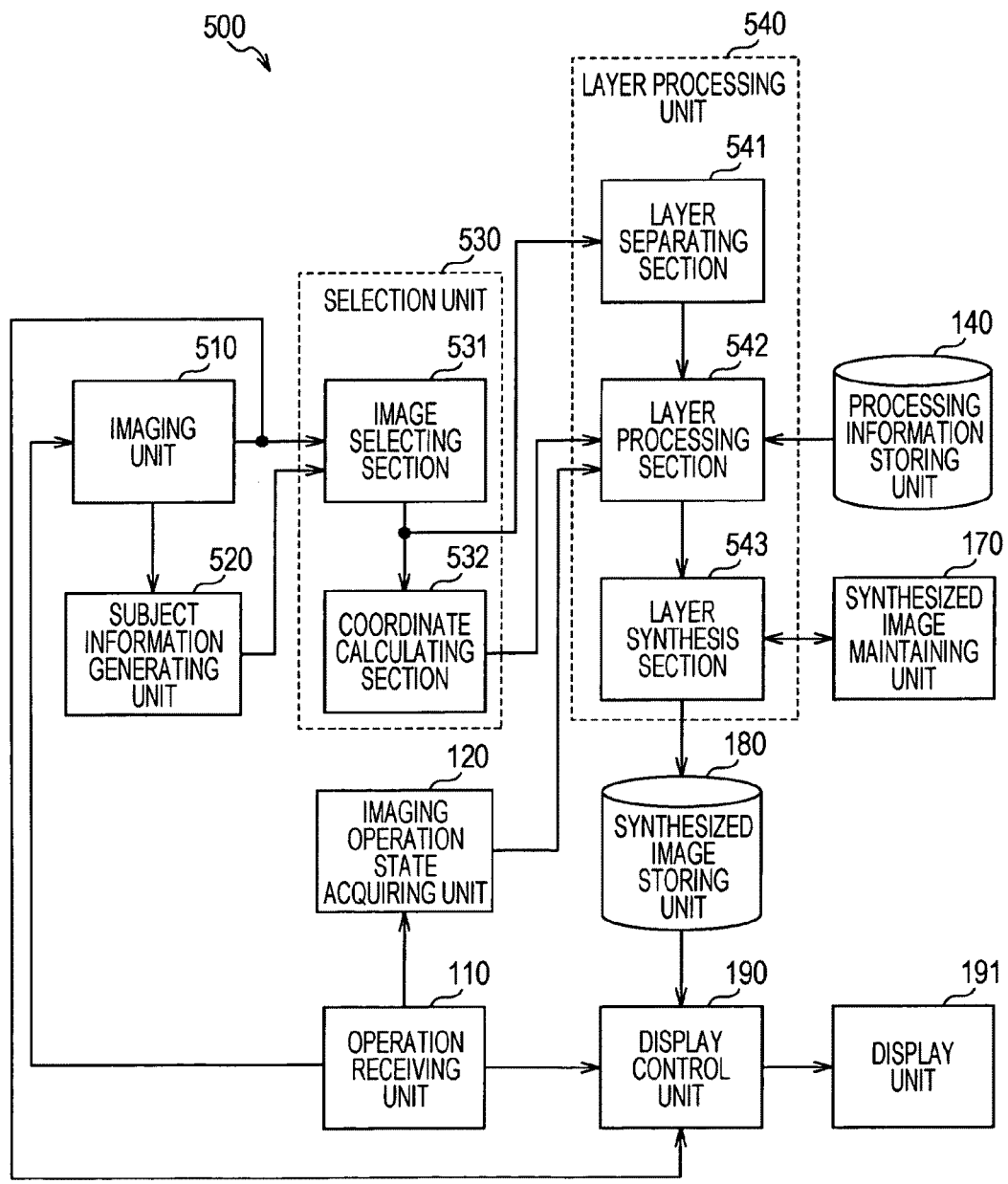
FIG. 15 is a block diagram representing a functional configuration example of an imaging apparatus according to the first embodiment of the present invention.

FIG. 15 is a block diagram representing a functional configuration example of an imaging apparatus 500 according to the first embodiment of the present invention. The imaging apparatus 500 is acquired by disposing an imaging unit 510, a subject information generating unit 520, a selection unit 530, and a layer processing unit 540 instead of the imaging unit 130, the image processing unit 150, and the image synthesis unit 160 in the imaging apparatus 100 shown in FIG. 1. Other parts are substantially the same as those of the imaging apparatus 100. Thus, the same reference sign is assigned to each common part, and the description of a part thereof is omitted. The imaging apparatus 500, for example, can be realized by a digital video camera that can generate a captured image (image data) by imaging a subject, extract characteristic amounts by performing image analysis for the image data, and perform various image processes by using the extracted characteristic amounts.

The imaging unit 510, similarly to the imaging unit 130 shown in FIG. 1, generates a captured image (image data). The imaging unit 510, in a case where the synthesis target image recording mode is set, generates captured images (frames) at a predetermined frame rate and sequentially supplies the generated captured images to the image selecting section 531. In addition, the generated captured image and the position and in-focus position of each lens (for example, a focus lens and a zoom lens) at the time of generation of the captured image are supplied to the subject information generating unit 520.

The subject information generating unit 520 generates subject information relating to the captured image based on the captured image generated by the imaging unit 510 and information (for example, the position and the in-focus position of the lens) at the time of generation of the captured image. Then, the subject information generating unit 520 sequentially supplies the generated subject information to the image selecting section 531. This subject information, for example, is information used for determining an area of an observed subject and a background area thereof out of the subject included in the captured image that is generated by the imaging unit 510. As this subject information, for example, a depth map is generated. Here, the depth map is data that represents a distance (subject distance) from an imaging position (for example, the position of the imaging apparatus 500) up to a subject included in the captured image. As a method of generating the depth map, for example, a TOF (Time of flight) method, a Depth from Defocus, or the like can be used. For example, the TOF method is a method in which light emitted from a light source is reflected by a target object, and a distance up to a subject is calculated based on a delay time of light until it reaches a sensor and the speed of light.

The selection unit 530 includes an image selecting section 531 and a coordinate calculating section 532.

The image selecting section 531 selects images (target images) that are used for a synthesis image generating process performed by the layer processing unit 540 from among captured images generated by the imaging unit 510. For example, the image selecting section 531 selects images from among the captured images generated by the imaging unit 510 at each predetermined interval as target images. Alternatively, for example, the target images may be selected so as to acquire an interval that is appropriate for visibly recognizing the transition in the operation of an observed subject. Then, the image selecting section 531 outputs information (for example, a target image and subject information on the target image) on the selected target image to the coordinate calculating section 532 and a layer separating section 541.

The coordinate calculating section 532 calculates coordinates, which are used for the synthesized image generating process performed by the layer processing unit 540, for each target image that is output from the image selecting section 531. Then, the coordinate calculating section 532 outputs the calculated coordinates to the layer processing section 542. In this coordinate calculation process, pixel positions of the synthesized image in which the target image as a calculation target is to be synthesized are calculated. In other words, in this coordinate calculation process, a pixel range, to which a synthesis target image as a calculation target is applied, out of a synthesized image that is finally generated is calculated.

The layer processing unit 540 includes the layer separating section 541, the layer processing section 542, and a layer synthesis section 543.

The layer separating section 541 performs layer separation for the target image selected by the image selecting section 531 by using corresponding subject information. Here, a layer is assumed to represent each image acquired by separating an observed subject portion and a background portion from one image (frame). Then, the layer separating section 541 outputs each separated layer image to the layer processing section 542.

The layer processing section 542 performs various processing processes for generating a synthesized image by using the coordinates calculated by the coordinate calculating section 532 for each layer image output from the layer separating section 541. These processing processes are the same as the above-described processing processes. Then, the layer processing section 542 outputs the layer images for which the processing processes have been performed to the layer synthesis section 543. Here, the layer processing section 542 is an example of an image processing unit according to an embodiment of the present invention.

The layer synthesis section 543 performs an image synthesizing process for the layer images output from the layer processing section 542 and stores the generated synthesized image in the synthesized image storing unit 180. In particular, the layer synthesis section 543 synthesizes the layer images such that the layer images output from the layer processing section 542 are disposed in a pixel range to which the layer images are applied. In addition, the layer synthesis section 543, after the synthesis process for the layer images that become the synthesis targets immediately before the current synthesis process, sequentially maintains the synthesized image (history image) in the synthesized image maintaining unit 170. Then, when a synthesis process for the layer images that become the next synthesis targets is performed, the layer synthesis section 543 acquires the synthesized image (history image) maintained in the synthesized image maintaining unit 170 from the synthesized image maintaining unit 170 and uses the synthesized image for the synthesis process. Here, the layer synthesis section 543 is an example of an image synthesis unit according to an embodiment of the present invention.

Example of Layer Separation of Synthesis Target Image

Figure 16A:
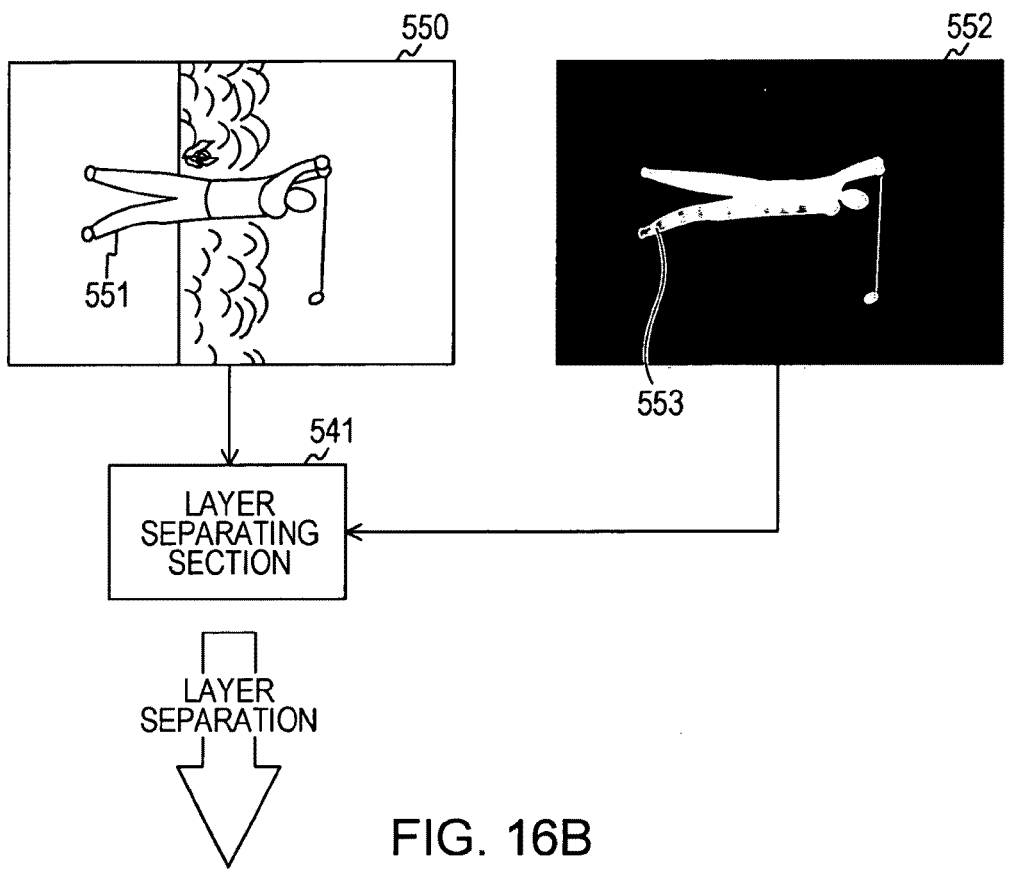
FIGS. 16A and 16B are diagrams schematically representing a method of separating a synthesis target image by using the layer separating section according to the first embodiment of the present invention.
Figure 16B:
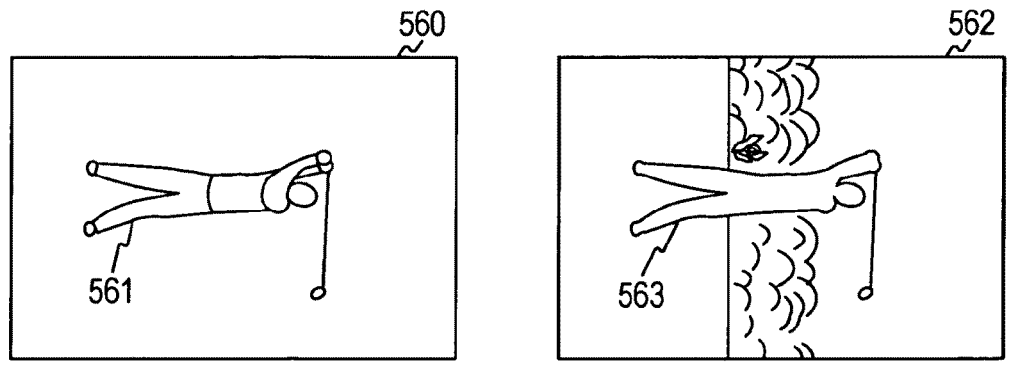

FIGS. 16A and 16B are diagrams schematically representing a method of separating a synthesis target image by using the layer separating section 541 according to the first embodiment of the present invention. This example represents an example in which a target image selected by the image selecting section 531 is separated into two layers based on the subject information generated by the subject information generating unit 520. The examples represented in FIGS. 16A to 19B represent examples of image synthesis in a case where the vertical shooting is performed.

FIG. 16A represents a target image 550 and subject information 552 that is generated for the target image 550. Here, the target image 550 is an image that includes a person 551. As the subject information generated by the subject information generating unit 520, for example, information in which "1" is assigned to a pixel corresponding to an observed subject area, and "0" is assigned to a pixel corresponding to an area such as a background area other than the observed subject area is generated. In FIG. 16A, the subject information 552 in which an area (observed subject area) corresponding to the person 551 is a white area 553, and an area (background area) other than the person 551 is a black area is schematically represented.

As described above, a captured image that is generated by the imaging unit 510 and the subject information that is generated in association with the captured image by the subject information generating unit 520 are sequentially supplied to the image selecting section 531. The image selecting section 531 selects images to be used for a synthesized image generating process performed by the layer processing unit 540 from among the captured images supplied from the imaging unit 510. Then, the image selecting section 531 outputs the selected target image and the subject information generated for the target image to the layer separating section 541. Then, the layer separating section 541 separates the target image output from the image selecting section 531 into two layers by using the corresponding subject information.

FIG. 16B represents an observed subject layer 560 and a background layer 562 that are separated by the layer separating section 541. The observed subject layer 560 is an image formed by extracting the observed subject area (that is, a pixel area to which "1" is assigned as the subject information 552) of the target image 550 shown in FIG. 16A. In other words, an area 561 corresponding to the person 551 included in the target image 550 is extracted. In addition, the background layer 562 is an image formed by extracting the background portion (that is, a pixel area to which "0" is assigned as the subject information 552) of the target image 550 shown in FIG. 16A. In other words, an area (an area other than an area 563) corresponding to the area (background area) other than the person 551 included in the target image 550 is extracted.

Figure 17A:
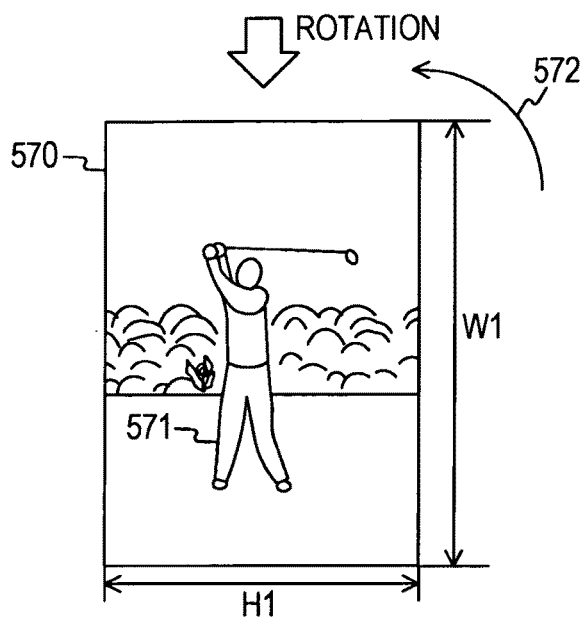
FIGS. 17A and 17B are diagrams showing an image for which a rotation process is performed by the layer processing section according to the first embodiment of the present invention and an image for which a cut-out process is performed by the layer processing section, in a simplified manner.
Figure 17B:
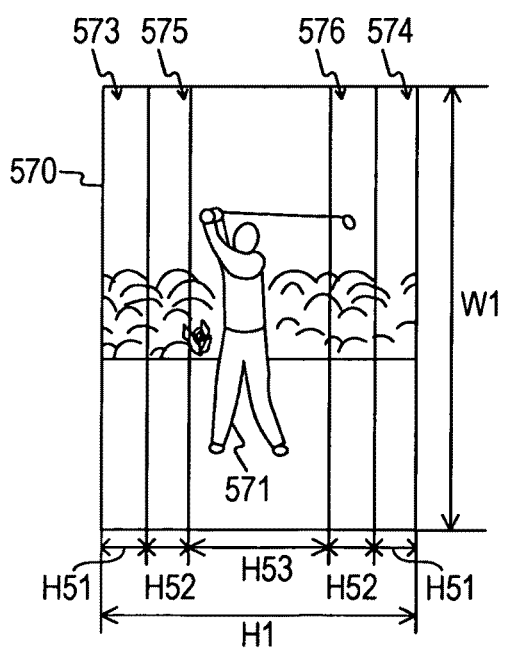

The layer processing section 542 performs various processing process for the layer images separated from each other as described above. This processing example will be described in detail with reference to FIGS. 17A and 17B.
Example of Processing Synthesized Target Image FIGS. 17A and 17B are diagrams showing an image for which a rotation process is performed by the layer processing section 542 according to the first embodiment of the present invention and an image for which a cut-out process is performed by the layer processing section 542, in a simplified manner. For convenience of the description, FIGS. 17A and 17B represent an example in which the processing process is performed by using a target image that is in the state before the layer separation.

FIG. 17A shows a target image 570 for which the rotation process (in the direction denoted by an arrow 572) is performed by the layer processing section 542. In addition, FIG. 17B schematically represents the cut-out process performed by the layer processing section 542. In the target image 570, a person 571 performing a golf swing is assumed to be included.

The target image 570 shown in FIG. 17A, for example, is assumed to have an image size of a vertical width W1 and a horizontal width H1. For example, the image size of the target image 570 can be set to a VGA size (640 pixels×480 pixels). In other words, it can be set such that W1=640 and H1=480.

The horizontal width H51 shown in FIG. 17B is the width of the cut-out areas 573 and 574. An image other than the cut-out areas 573 and 574 is an image corresponding to a transition operation effective area of the target image 570 shown in FIG. 17A. This transition operation effective area is an area that is used for cutting out the observed subject out of the subjects included in the target image before the processing process. For example, the image size of an image corresponding to the transition operation effective area can be set to 320 pixels×640 pixels.

The horizontal width H52 shown in FIG. 17B is the width of the cut-out areas 575 and 576. An image (an image of the horizontal width H53) other than the cut-out areas 573 to 576 is an image corresponding to a remaining background area of the target image 570 shown in FIG. 17A. This remaining background area is an area that is used as a background image in the synthesis process. For example, the image size of the image corresponding to the remaining background area can be set to 160 pixels×640 pixels.

Here, the center positions of the transition operation effective area and the remaining background area are assumed to coincide with the center position of the target image.

Figures 18A, 18B:
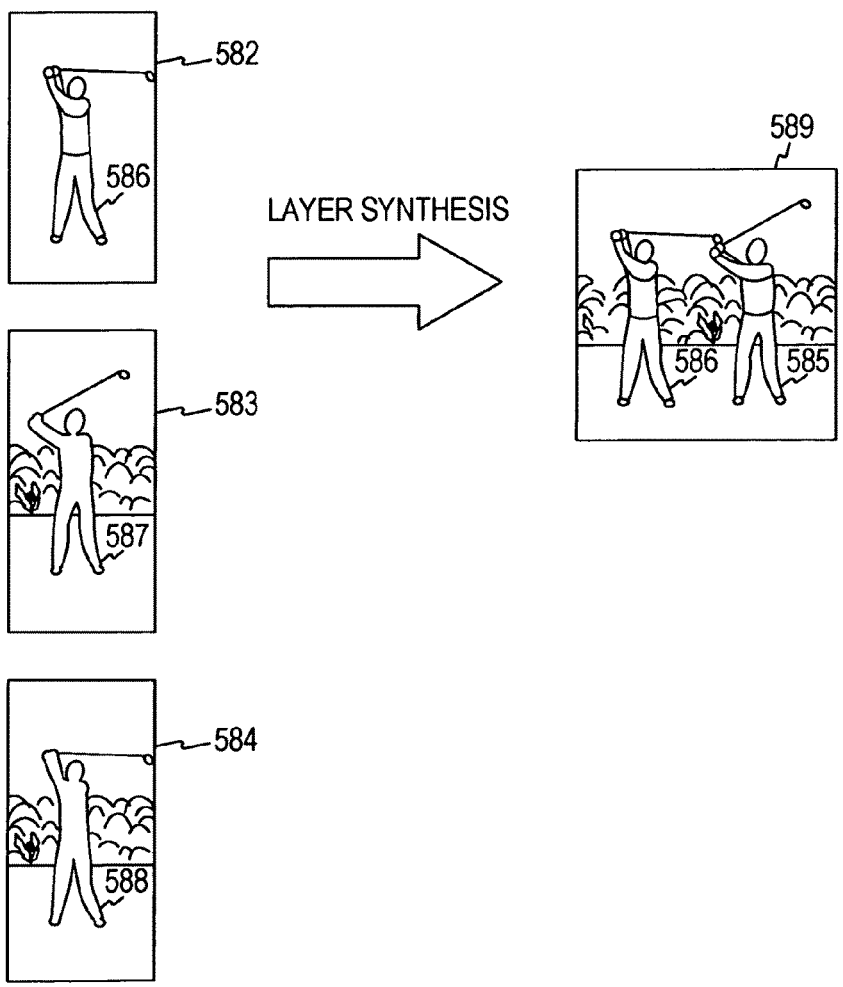
FIGS. 18A and 18B are diagrams schematically representing a synthesis method using the layer synthesis section according to the first embodiment of the present invention.

In addition, the example represented in FIGS. 17A and 17B is merely an example. Thus, it is preferable that, in accordance with the size and the movement of the subject, the widths and the heights of the transition operation effective area and the remaining background area are appropriately set so as to be cut as an image used for the synthesis process.
Example of Image Synthesis FIGS. 18A and 18B are diagrams schematically representing a synthesis method using the layer synthesis section 543 according to the first embodiment of the present invention. This example represents an example in which the synthesis process is performed for two synthesis target images that are consecutive in a time series.

FIG. 18A shows synthesis target images (two synthesis target images consecutive in a time series) that are separated by the layer separating section 541 and are processed by the layer processing section 542 in a simplified manner. As described above, the synthesis target image is separated into an observed subject layer and a background layer by the layer separating section 541. In addition, the layer processing section 542 performs a processing process for the observed subject layer and the background layer that are separated by the layer separating section 541. As above, as two synthesis target images that are consecutive in a time series are separated and processed, four layers (the first priority image 581 to the fourth priority image 584) are generated, as shown in FIG. 18A.

First, it is assumed that the first priority image 581 is an observed subject layer of the synthesis target image that is disposed to be latter in the time axis, and the third priority image 583 is a background layer of the synthesis target image. In addition, it is assumed that the second priority image 582 is an observed subject layer of the synthesis target image that is disposed to be former in the time axis, and the fourth priority image 584 is a background layer of the synthesis target image. In a case where such images are synthesized, the images are synthesized such that an image having a higher priority is written in an overwriting manner.

FIG. 18B shows a synthesized image 589 that is generated based on the priority levels of the layer images. In other words, the layer synthesis section 543 generates a synthesized image 589 by synthesizing four layers (the first priority image 581 to the fourth priority image 584) based on the priority levels. The synthesized image 589 is an image that is synthesized such that a person image 585 included in the first priority image 581 and a person image 586 included in the second priority image 582 overlap on the upper side in a background area that is synthesized by the third priority image 583 and the fourth priority image 584. In such a case, the third priority image 583 is synthesized so as to overlap on the upper side that is upper than the fourth priority image 584. In addition, the image synthesis is performed such that the person image 585 included in the first priority image overlap on the upper side upper than the person image 586 included in the second priority image 582.

Figure 19A:
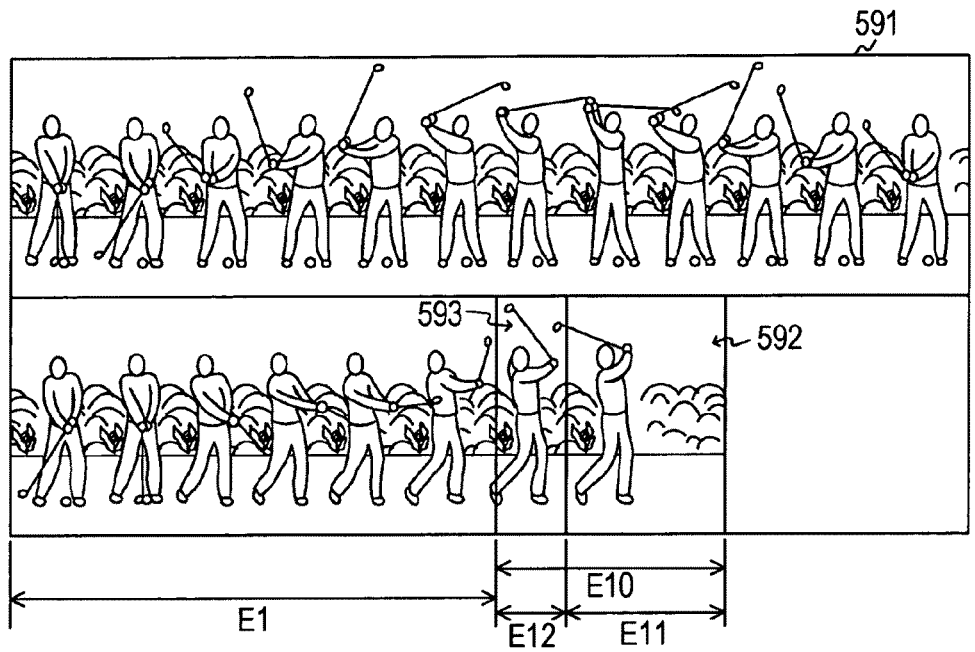
FIGS. 19A and 19B are diagrams schematically showing the method of synthesizing the synthesis target images by using the layer synthesis section according to the first embodiment of the present invention.
Figure 19B:
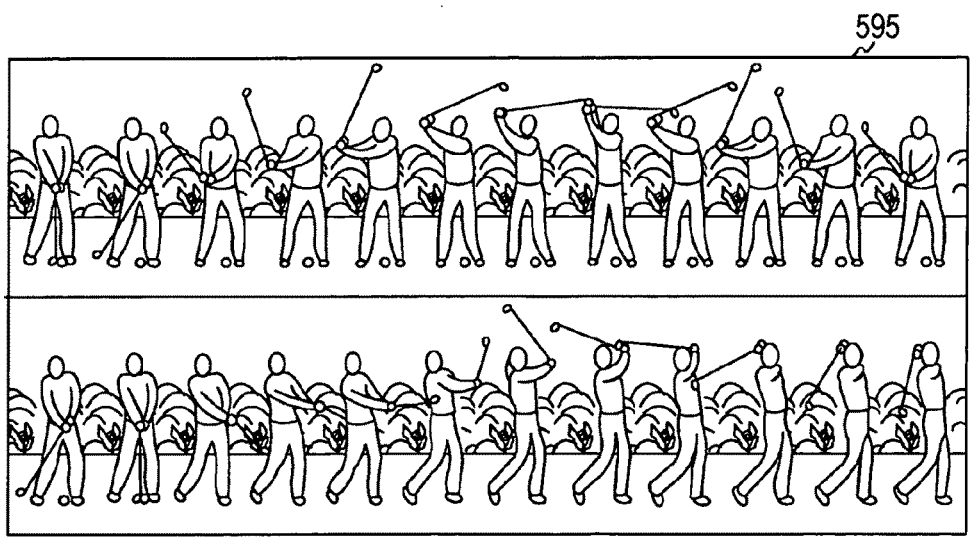

In addition, as shown in FIGS. 19A and 19B, in a case where a synthesized image is generated by sequentially synthesizing three or more synthesis target images, the synthesized image is generated by sequentially synthesizing the synthesis target images along a time series. In addition, of the two synthesis target images that are consecutive in a time series, the synthesis target image that is disposed to be former on the time axis is maintained in the synthesized image maintaining unit 170 until a synthesis process for the latter synthesis target image is performed.

FIGS. 19A and 19B are diagrams schematically showing the method of synthesizing the synthesis target images by using the layer synthesis section 543 according to the first embodiment of the present invention. This example represents an example of synthesizing synthesis target images until the synthesized image 595 shown in FIG. 19B is generated.

FIG. 19A represents the synthesis state at a specific time point until the synthesized image 595 shown in FIG. 19B is generated. For example, the state shown in FIG. 19A is assumed to be at a time point when the synthesis process is performed for the synthesis target images 592 (two layer images). In other words, FIG. 19A represents a transition operation effective area E10 corresponding to the synthesis target image 592 and a synthesized image 591 acquired by performing a synthesis process for the immediately previous synthesis target image 593. In this example, it is assumed that the layer images that become the synthesis target immediately before are maintained in the synthesized image maintaining unit 170.

Here, in an area E11 of the synthesis target image 592, there is no overlapping area between the immediately prior synthesis target image 593 and a synthesis target image 592. Accordingly, in a case where the synthesis target image 592 is synthesized to the synthesized image 591, in an area E11 of the synthesis target image 592, the pixel of the transition operation effective area of the synthesis target image 592 is directly synthesized to the synthesized image 591 in an overwriting manner as a new synthesis image.

However, in an area E12 of the synthesis target image 592, the synthesis target image 592 overlaps with a part of the immediately prior synthesis target image 593. Thus, in the area E12 of the synthesis target image 592, as shown in FIGS. 18A and 18B, the layer images are synthesized along the priority level.

In other words, the layer synthesis section 543, in the area E12, synthesizes the layer images based on the priority levels by using the layer images of the synthesis target image 592, which becomes a synthesis target of this time and the synthesis target image 593 of the immediately previous time that is maintained in the synthesized image maintaining unit 170. By performing such synthesis, a synthesized image of area "E11+E12" is generated from the synthesis target images 592 and 593. Then, the layer synthesis section 543 synthesizes the synthesized image of the area "E11+E12" generated as described above to the synthesized image (a synthesized image to which the immediately previous synthesis target image 593 has been synthesized) maintained in the synthesized image maintaining unit 170 in an overwriting manner. In other words, the layer synthesis section 543 performed a process in which the synthesized image of the area E11+E12 generated through synthesis as described above and E1 corresponding to the synthesized image maintaining in the synthesized image maintaining unit 170 are attached together.

In addition, the synthesis target image 592 (two layer images) that is currently the synthesis target and the synthesized image generated by the synthesis process of this time are maintained in the synthesized image maintaining unit 170 and are used for the synthesis process next time. An example of the synthesized image generated as above is shown in FIG. 19B.

As described above, for an area (for example, the area E12) that overlaps between consecutive images at the time of the synthesis process, first, by synthesizing the layer images based on the priority levels, a synthesized image can be generated without incurring loss of a part of the observed subject. Accordingly, even in a case where a synthesized image is generated by using a plurality of synthesis target images, an operation-transition image capable of appropriately representing the operation of the observed subject can be generated.

As above, the synthesized image 595 generated by the layer synthesis unit 543 is stored in the synthesized image storing unit 180. Then, the synthesized image 595 is displayed in the display unit 191, for example, in accordance with a user's operation. In addition, for example, the synthesized image may be automatically displayed in the display unit 191 each time when the synthesized image is generated by the layer synthesis section 543.

2. Second Embodiment

In the first embodiment of the present invention, an example in which an imaging operation state used for the synthesis target image processing process is designated by a user's operation has been represented. In the second embodiment of the present invention, an example in which the imaging operation state is acquired by using a method other than the user's operation will be represented.

Configuration Example of Imaging Apparatus

Figure 20:
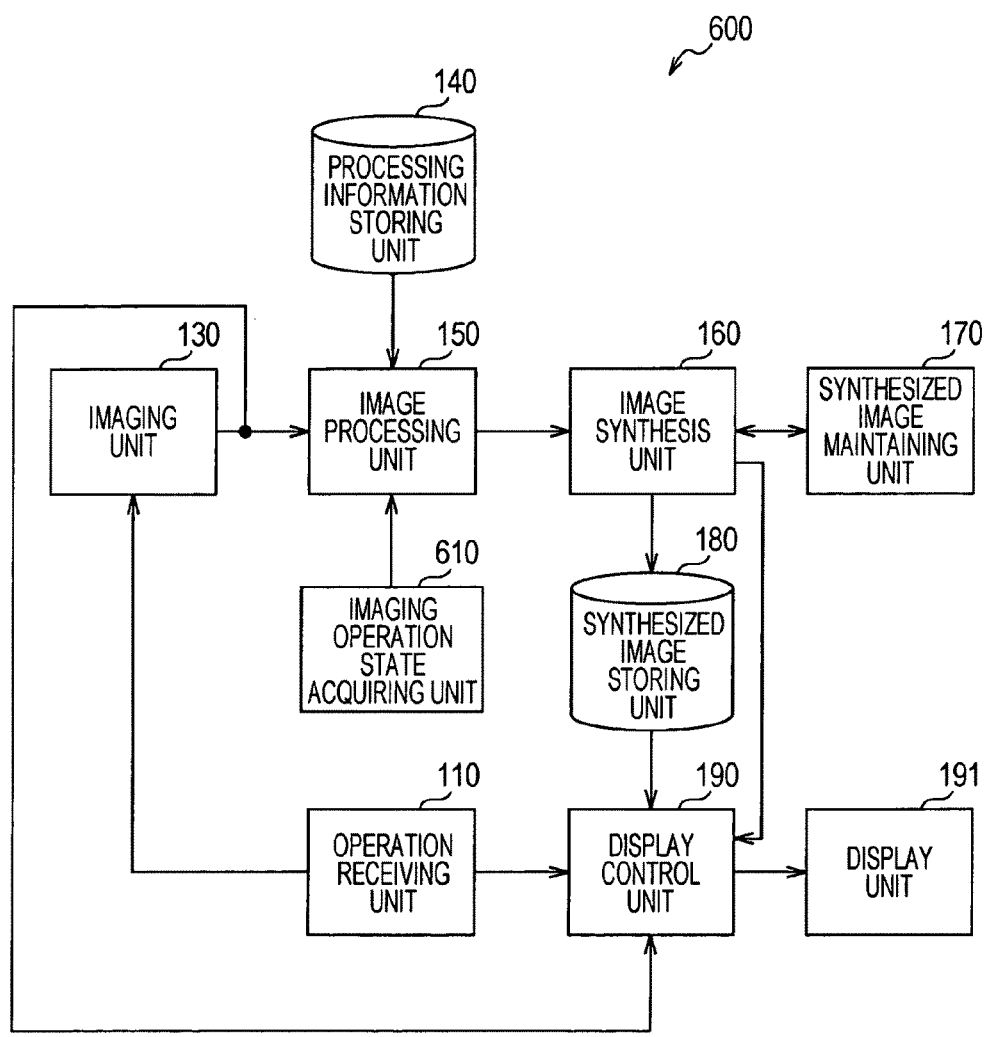
FIG. 20 is a block diagram representing a functional configuration example of an imaging apparatus according to the second embodiment of the present invention.

FIG. 20 is a block diagram representing a functional configuration example of an imaging apparatus 600 according to the second embodiment of the present invention. The imaging apparatus 600 is acquired by disposing an imaging operation state acquiring unit 610 instead of the imaging operation state acquiring unit 120 in the imaging apparatus 100 shown in FIG. 1. Other parts are substantially the same as those of the imaging apparatus 100. Thus, the same reference sign is assigned to each common part, and the description of a part thereof is omitted.

The imaging operation state acquiring unit 610 detects the posture of the imaging apparatus 600 by detecting the acceleration, the movement, the tilt, and the like of the imaging apparatus 600, whereby acquiring the imaging operation state. In addition, the imaging operation state acquiring unit 610 supplies information representing the acquired imaging operation state (imaging operation state information) to the image processing unit 150. As such imaging operation state information, as represented in FIG. 2, information on the rotation angle (0 degrees (the horizontal shooting) or 90 degrees (the vertical shooting)) of the imaging apparatus 600 with the optical axis of the imaging apparatus 600 being used as the center is acquired. The imaging operation state acquiring unit 610, for example, can be realized by a zyro sensor or an acceleration sensor.

Another Configuration Example of Imaging Apparatus

Figure 21:
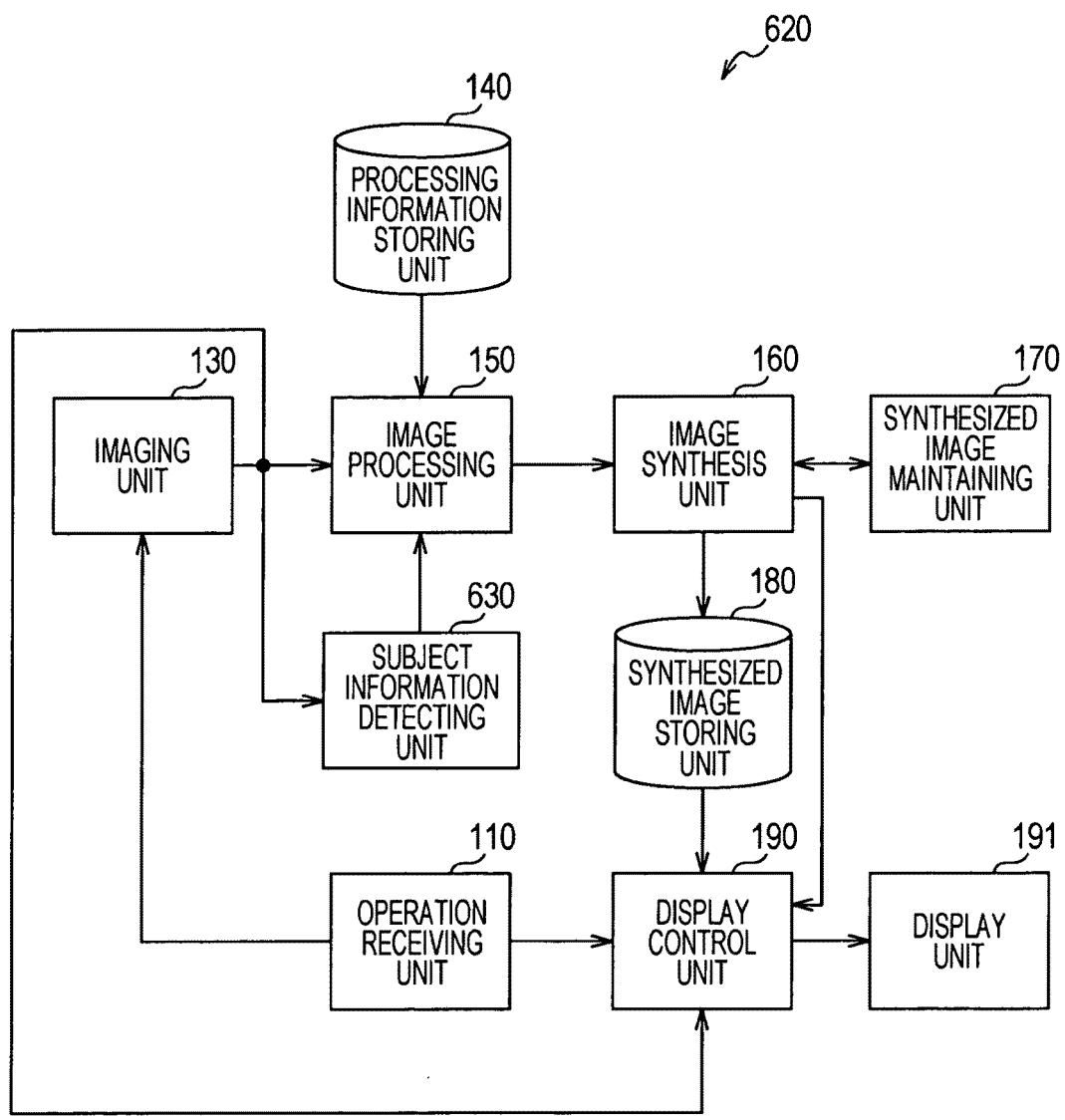
FIG. 21 is a block diagram representing a functional configuration example of an imaging apparatus according to the second embodiment of the present invention.

FIG. 21 is a block diagram representing a functional configuration example of an imaging apparatus 620 according to the second embodiment of the present invention. The imaging apparatus 620 is acquired by disposing a subject information detecting unit 630 instead of the imaging operation state acquiring unit 120 in the imaging apparatus 100 shown in FIG. 1. Other parts are substantially the same as those of the imaging apparatus 100. Thus, the same reference sign is assigned to each common part, and the description of a part thereof is omitted.

The subject information detecting unit 630 detects information on a subject that is included in the captured image generated by the imaging unit 130 so as to acquire the imaging operation state. In addition, the subject information detecting unit 630 supplies information representing the acquired imaging operation state (imaging operation state information) to the image processing unit 150. As such imaging operation state information, as represented in FIG. 2, information on the rotation angle (0 degrees (the horizontal shooting) or 90 degrees (the vertical shooting)) of the imaging apparatus 600 with the optical axis of the imaging apparatus 600 being used as the center is acquired.

For example, the subject information detecting unit 630 detects a person's face that is included in a captured image generated by the imaging unit 130 and specifies the vertical direction of the detected face, whereby acquiring the imaging operation state. In addition, for example, the subject information detecting unit 630 detects a human body included in the captured image generated by the imaging unit 130 and specifies the vertical direction of the detected human body, whereby acquiring the imaging operation state. As a method of detecting a face that is included in the captured image, for example, a face detecting method (for example, see Japanese Unexamined Patent Application Publication No. 2004-133637) through matching between a template in which luminance distribution information of a face is recorded and a captured image can be used. In addition, a face detecting method on the basis of a skin-colored portion or the characteristic amounts of a human face included in the captured image can be used. Furthermore, based on attribute information of a detected face, the vertical direction of the detected face in the imaging apparatus can be detected. As this attribute detecting method, for example, a detection method in which each attribute is detected by a simplified determination device using a differential value of luminance between two points in a face image can be used (for example, see Japanese Unexamined Patent Application Publication No. 2009-118009). By using such a detection method, the vertical direction in a captured image of a person's face can be acquired. The subject information detecting unit 630 is an example of an imaging operation state acquiring unit according to an embodiment of the present invention.

3. Third Embodiment

In the first and second embodiments of the present invention, an example in which the transition in the operation of a person mainly performing a golf swing is generated as a synthesized image has been represented. Here, the first and second embodiments of the present invention can be applied to a case where the transition in the operation, for example, in sports other than the golf is generated as a synthesized image as well. In addition, the first and second embodiments of the present invention can be applied to a case where the transition in a predetermined operation of movement of an observed subject under a predetermined rule is generated as a synthesized image as well. Thus, in the third embodiment of the present invention, an example in which the synthesized image is generated in accordance with a user's taste will be represented.

Example of Observed Subject

FIGS. 22A to 22H are diagrams showing examples of an observed subject and a predetermined operation that become a target for generating a synthesized image by using the imaging apparatus according to the third embodiment of the present invention. FIG. 23 is a diagram representing an example of an observed subject and the characteristics of the predetermined operation that become a target for generation of a synthesized image of the imaging apparatus according to the third embodiment of the present invention.

FIGS. 22A to 22H represent examples of the observed subject and the predetermined operation in a graphical manner. For example, a person 651 is a person who performs batting in a baseball game, a person 652 is a person who pitches a ball in a baseball game, and a person 653 is a person who performs shooting in a soccer game. In addition, a person 654 is a person who performs a serve in tennis, a person 655 is a person who performs shooting in a basketball game, and a person 656 is a person who performs crawling in swimming. In addition, a person 657 is a person who performs Japanese Fencing, and a person 658 is a person who runs in a short track.

In addition, the moving ranges 661 to 668 considered in accordance with predetermined operations of the persons 651 to 658 shown in FIG. 22A to 22H are schematically represented in dotted rectangles.

FIG. 23 represents examples of the observed subjects shown in FIGS. 22A to 22H and the characteristics of the predetermined operations in a table form. In the table shown in FIG. 23, as the observed subjects shown in FIG. 22A to 22H and the characteristics of the predetermined operations, an observed subject state 672, an operation range 673, an imaging operation method 674, and the aspect ratio 675 of the synthesis target image are shown. In addition, figures corresponding to FIGS. 22A to 22H are represented in a corresponding FIG. 671.

Figure 22A:
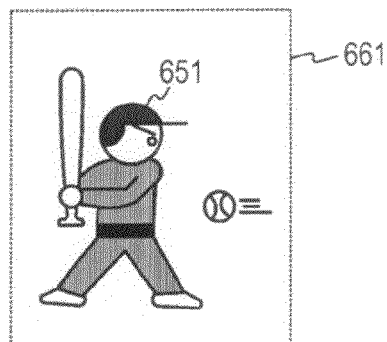
FIGS. 22A to 22H are diagrams showing examples of an observed subject and a predetermined operation that become a target for generating a synthesized image by using the imaging apparatus according to the third embodiment of the present invention.
Figure 22B:
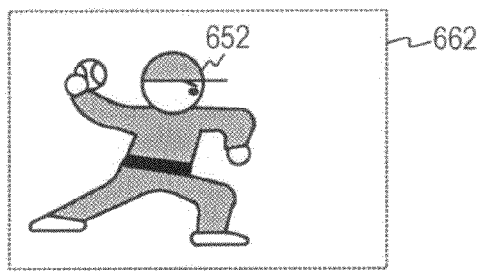
Figure 22C:
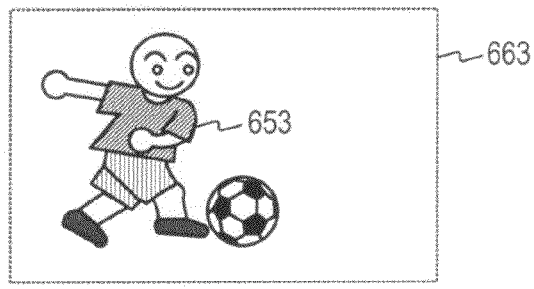
Figure 22D:
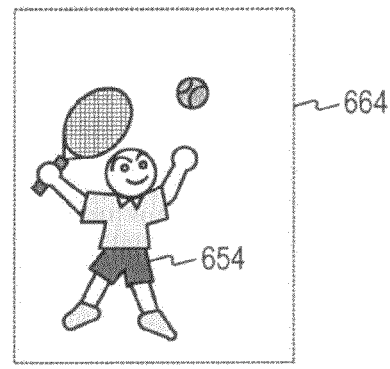
Figure 22E:
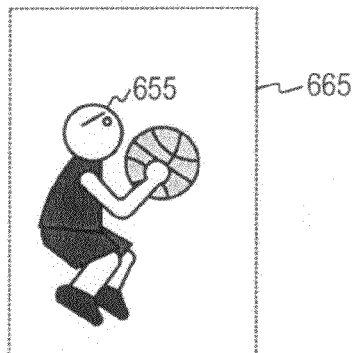
Figure 22F:
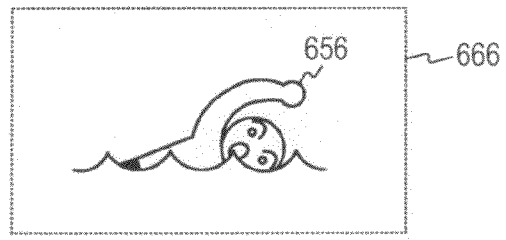
Figure 22G:
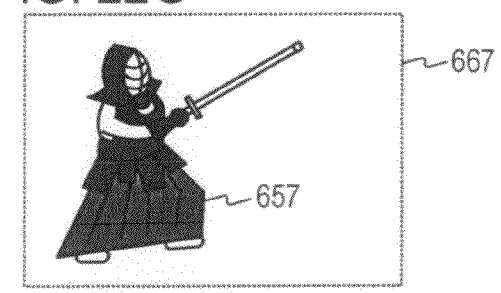
Figure 22H:
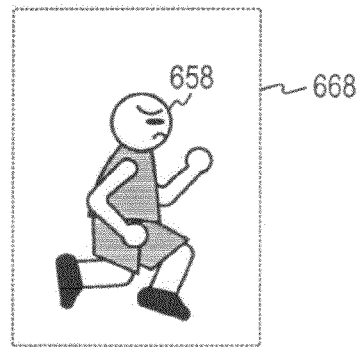

The observed subject state 672 is the state of the observed subject (persons 651 to 658). For example, swimming, as shown in FIG. 22F, is performed in the state in which the state of a person is in the horizontal direction. Accordingly, "horizontally long" is represented in the observed subject state 672. On the other hand, sports other than the swimming are played mainly in a standing state. Accordingly, "vertically long" is represented in the observed subject state 672.

The operation range 673 is an assumed operation range (the operation range of the predetermined operation) of the observed subject. In the operation range 673, for example, in a case where the operation range of the observed subject is relatively large, "Large" is represented, and, in a case where the operation range of the observed subject is small, "Small" is represented. On the other hand, in a case where the operation range of the observed subject is in the middle thereof, "Medium" is represented therein. In addition, the main movement direction is represented in parentheses. Furthermore, in swimming and athletics (short track), the observed subject is moving all the time, and thus indications thereof are represented.

The imaging operation method 674 is the state of the imaging apparatus in a case where an observed subject is photographed. For example, in swimming and athletics (short track), as described above, the observed subject is moving all the time. Accordingly, the imaging apparatus is necessarily moved in accordance with the movement. On the other hand, in many other sports in which the observed subject moves within a predetermined range, and accordingly, the imaging apparatus can perform photographing while being fixed.

The aspect ratio of the synthesis target image 675 is a value corresponding to the size of the synthesis target image configuring the synthesized image. The aspect ratio of the synthesis target image 675 corresponds to the moving range of the observed subject and, for example, corresponds to the aspect ratio of each of the moving ranges 661 to 668 (dotted rectangles) shown in FIGS. 22A to 22H.

Configuration Example of Imaging Apparatus

Figure 24:
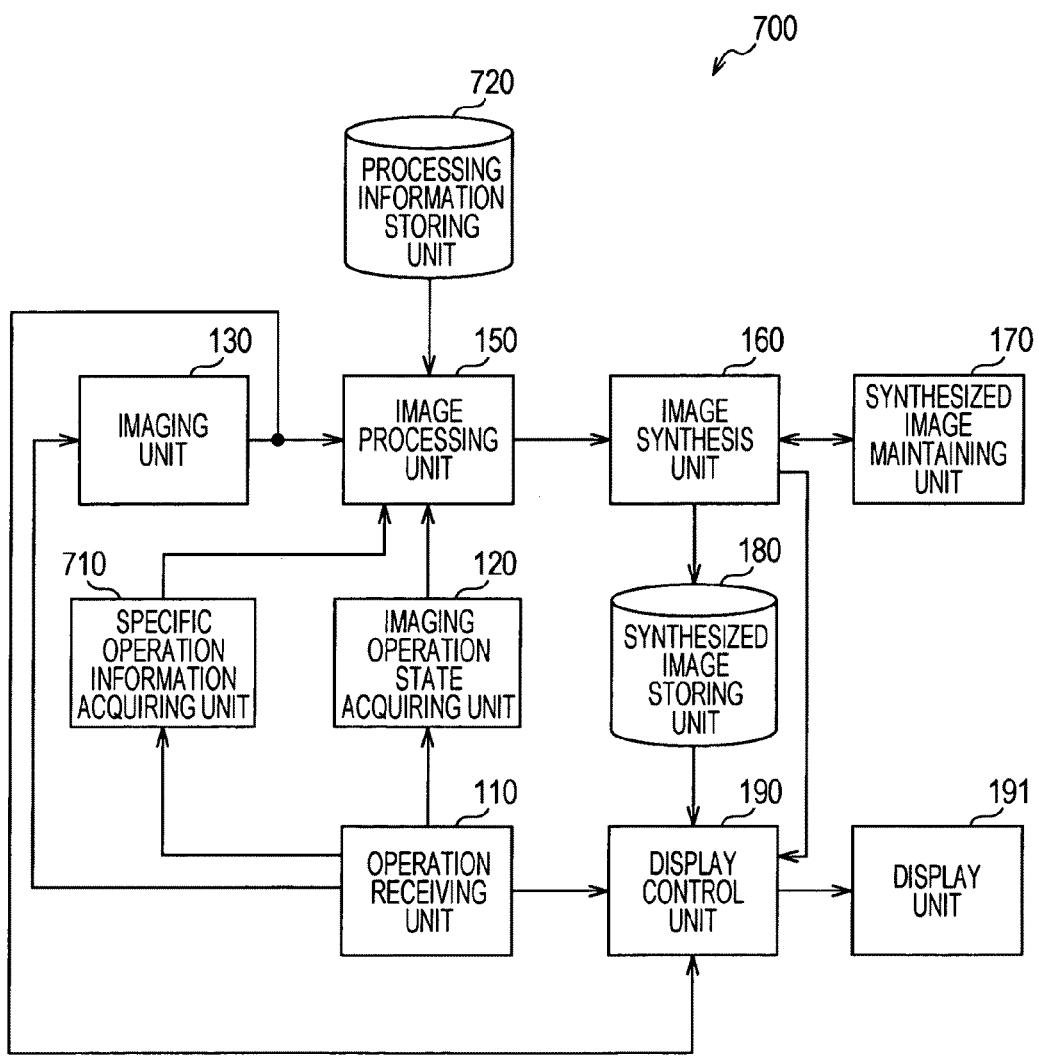
FIG. 24 is a block diagram representing a functional configuration example of an imaging apparatus according to the third embodiment of the present invention.

FIG. 24 is a block diagram representing a functional configuration example of an imaging apparatus 700 according to the third embodiment of the present invention. The imaging apparatus 700 is acquired by disposing a processing information storing unit 720 instead of the processing information storing unit 140 and adding a predetermined operation information acquiring unit 710 in the imaging apparatus 100 shown in FIG. 1. Other parts are substantially the same as those of the imaging apparatus 100. Thus, the same reference sign is assigned to each common part, and the description of a part thereof is omitted.

The predetermined operation information acquiring unit 710 acquires a predetermined operation (for example, sports or the like) performed by the observed subject and maintains information (predetermined operation information) representing the acquired predetermined operation. In this predetermined operation information, for example, as shown in FIGS. 22A to 22H and 23, information representing each sport is maintained. Then, the predetermined operation information acquiring unit 710 supplies the maintained predetermined operation information to the image processing unit 150.

The processing information storing unit 720 stores information (processing information) used for a processing process of the synthesis target image that is performed by the image processing unit 150 and supplies the stored processing information to the image processing unit 150. The stored content of the processing information storing unit 720 will be described in detail with reference to FIG. 26. Here, the processing information storing unit 720 is an example of a storage unit according to an embodiment of the present invention.

Example of Display of Predetermined Operation Designating Screen

Figure 25:
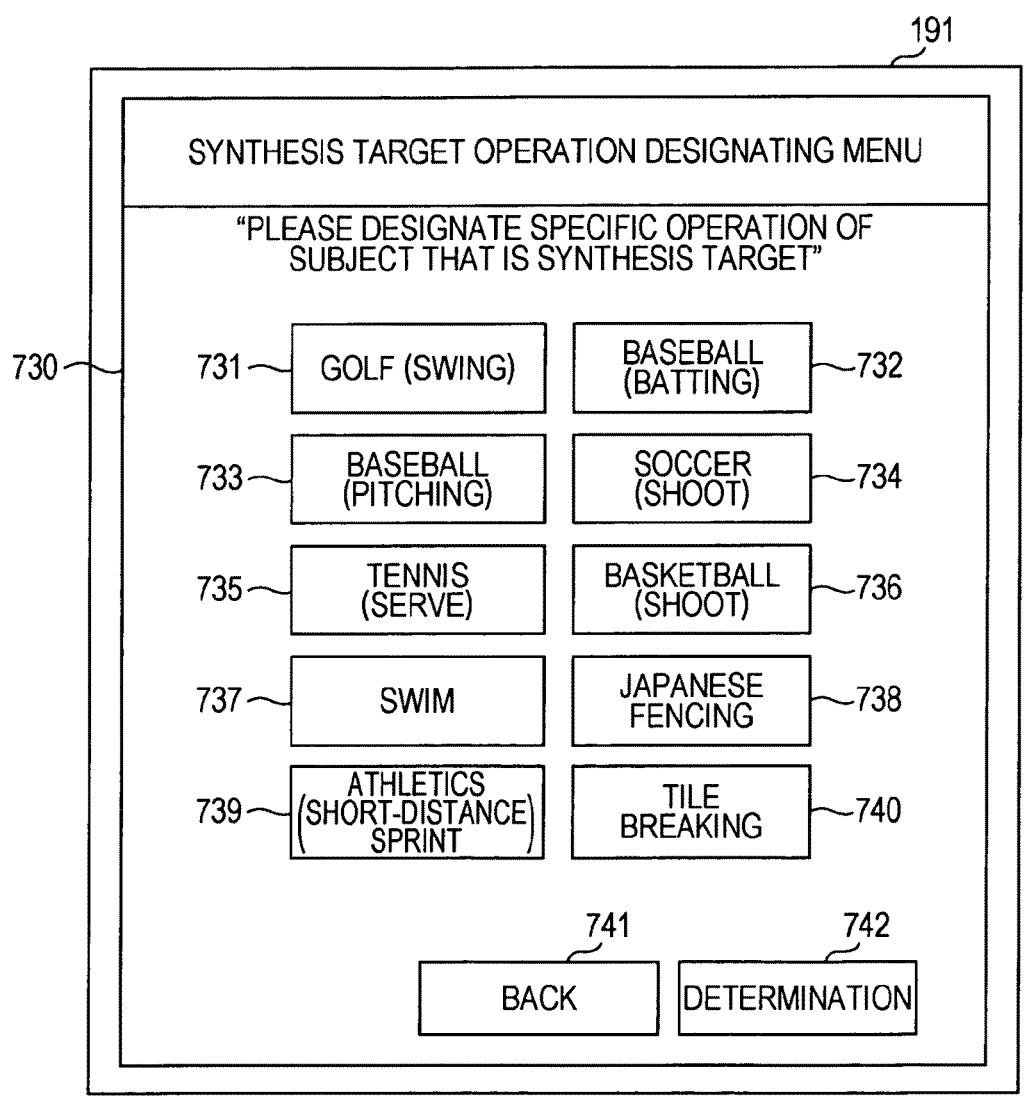
FIG. 25 is a diagram representing an example of display of the display unit according to the third embodiment of the present invention.

FIG. 25 is a diagram representing an example of display (a predetermined operation designating screen 730) of the display unit 191 according to the third embodiment of the present invention. The predetermined operation designating screen 730 is a designation screen for designating a predetermined operation. On the predetermined operation designating screen 730, predetermined operation buttons 731 to 740, a back button 741, and a determination button 742 are disposed.

The predetermined operation buttons 731 to 740 are buttons that are pressed down when a predetermined operation is designated. For example, the predetermined operation buttons 731 to 740 are buttons corresponding to the sports shown in FIGS. 22A to 22H and 23.

The determination button 742 is a button that is pressed down when designation is to be determined after a pressing-down operation designating the predetermined operation is performed. The back button 741, for example, is a button that is pressed down so as to return to a display screen that is displayed immediately prior to the current display screen.

Example of Storage of Processing Information Storing Unit

FIG. 26 is a diagram representing an example of the stored content of the processing information storing unit 720 according to the third embodiment of the present invention. In the processing information storing unit 720, a rotation angle 721, the aspect ratio 722 of the synthesis target image, and the size 723 of the synthesis target image are stored in association with the predetermined operations 751 to 760. In addition, the golf (swing) 751 corresponds to the horizontal shooting 141 and the vertical shooting 142 shown in FIG. 6B.

In the rotation angle 721, the rotation angle with respect to the imaging operation state shown in FIG. 2A is stored. For example, "0 degrees" is stored as being associated with the horizontal shooting of the predetermined operations 751 to 760, and "90 degrees" is stored as being associated with the vertical shooting 142 of the predetermined operations 751 to 760.

In the aspect ratio 722 of the synthesis target image, the aspect ratio of the synthesis target image is stored. In the example represented in FIG. 26, an example in which the same value as that of the aspect ratio 675 of the synthesis target image shown in FIG. 23 is used is represented.

In the size 723 of the synthesis target image, the size of the synthesis target image is stored. This size is determined based on the size of the synthesized image, the number of synthesis target images configuring the synthesized image, the aspect ratio of the synthesis target image, and the like. In the example shown in FIG. 26, only a value corresponding to the golf (swing) 751 is written, and the characteristics of other values are written as below.

For example, the aspect ratio of the baseball (batting) 752 is preferably set to be horizontally long. However, since there is a hardly an operation range in the vertical direction, the aspect ratio may not be set to be horizontally long to the degree of the case of the golf (swing) 751. In addition, for example, for the baseball (pitching) 753, since the observed subject moves much in the horizontal direction, the aspect ratio of the baseball (pitching) 753 is preferably set to be horizontally long. In addition, for example, for the case of the soccer (shooting) 754, since the observed subject moves much in the horizontal direction, the aspect ratio of the soccer (shooting) 754 is preferably set to be horizontally long, and is preferably set to be horizontally long to a degree higher than that of the baseball (pitching) 753. In addition, for example, the aspect ratio of the tennis (serve) 755 may be set to be the same as that of the golf (swing) 751. In addition, for example, for the case of the basketball (shooting) 756, although a jump shoot is considered, there is hardly a movement in the horizontal direction. Accordingly, the aspect ratio of the basketball (shooting) 756 is preferably set to be vertically long. In addition, for example, for the case of the swimming 757, since the imaging apparatus 700 is moved so as to follow the observed subject, there are many cases where the aspect ratio of the swimming 757 may not be set in consideration of the influence of the movement of the observed subject. However, for the case of the swimming, since there is hardly a movement in the vertical direction, the aspect ratio of the swimming is preferably set in the horizontally long. In addition, for the case of the athletics (short track) 758, since the imaging apparatus 700 is moved so as to follow the observed subject, there are many cases where the influence of the movement of the observed subject may not be considered. In addition, for the case of the athletics (short track), the movement in the horizontal direction is assumed to be not that much, the aspect ratio of the athletics (short tract) is preferably set to be vertically long. In addition, for example, the aspect ratio of the Japanese Fencing 759 may be set to be the same as that of the soccer (shooting) 754. In addition, for the case of tile breaking 760, since there is hardly a movement in the horizontal direction, the aspect ratio of the tile breaking 760 is preferably set to be vertically long.

Here, the processing process performed by the imaging apparatus 700 will be described. For example, a baseball pitching scene is photographed in the horizontal shooting will be considered. In such a case, for example, in the imaging operation state designating screen 200 shown in FIG. 6A, a user presses down the "horizontal shooting" button 201 and then presses down the determination button 204. In this case, an operation signal indicative of such a user's operation is output from the operation receiving unit 110 to the imaging operation state acquiring unit 120, and the imaging operation state acquiring unit 120 maintains the imaging operation state information (horizontal shooting) that represents the designated imaging operation state.

In addition, on the predetermined operation designating screen 730 shown in FIG. 25, a user presses down the "baseball (pitching)" button 733, and then presses down the determination button 742. In this case, an operation signal indicative of such a user's operation is output from the operation receiving unit 110 to the predetermined operation information acquiring unit 710, and the predetermined operation information acquiring unit 710 maintains the predetermined operation information (baseball (pitching)) representing the designated predetermined operation. Then, the image processing unit 150 acquires processing information that is associated with the imaging operation state information (the horizontal shooting) maintained in the imaging operation state acquiring unit 120 and the predetermined operation information (baseball (pitching)) maintained in the predetermined operation information acquiring unit 710. In other words, the image processing unit 150 acquires the processing information (the horizontal shooting of the baseball (pitching) 753) stored in the processing information storing unit 140 and performs each processing process for the captured images supplied from the imaging unit 130 based on the processing information. An example of the processing process performed as described above is shown in FIGS. 27A to 27C.

Example of Generation of Image Synthesis on Basis of Imaging Operation State

Figure 27A:
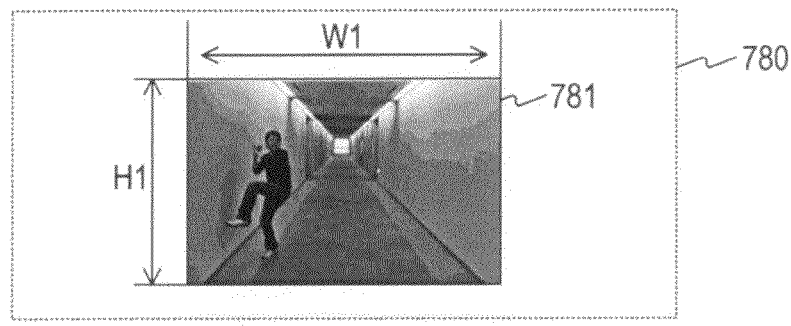
FIGS. 27A to 27C are diagrams schematically showing an example of the flow of the captured image processing process, which is performed by the image processing unit, and the synthesized image generating process, which is performed by the image synthesis unit, according to the third embodiment of the present invention.
Figure 27B:
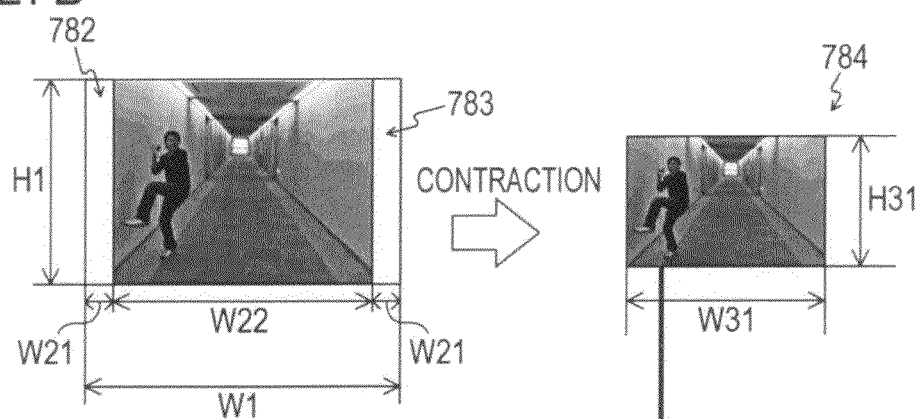
Figure 27C:
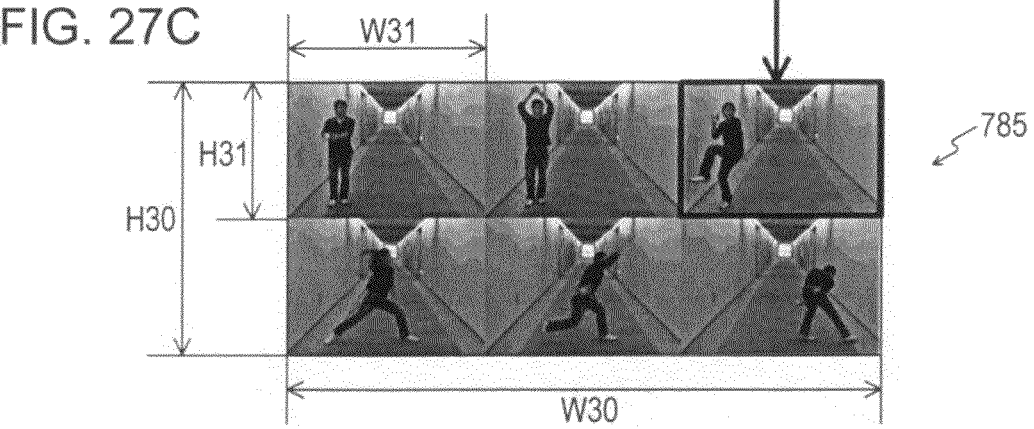

FIGS. 27A to 27C are diagrams schematically showing an example of the flow of the captured image processing process, which is performed by the image processing unit 150, and the synthesized image generating process, which is performed by the image synthesis unit 160, according to the third embodiment of the present invention. This example represents an example of the captured image processing process and the synthesized image generating process in a case where the horizontal shooting and the baseball (pitching) are designated. This example is a modified example of the example represented in FIGS. 11A to 11C, and there are differences between this modified example and the example shown in FIGS. 11A to 11C in that the rotation process is not performed, and the size of the synthesized image, the number of the synthesis target images, and the like are different from those of example shown in FIGS. 11A to 11C. However, other parts are common to the example shown in FIGS. 11A to 11C. Thus, detailed description thereof is omitted below.

As described above, even in a case where a synthesized image is generated for a predetermined operation of an observed subject of a plurality of types, by user's designating a desired predetermined operation out of predetermined operations of the observed subject of the plurality of types, a synthesized image can be generated in an easy manner. Accordingly, an image according to the user's taste can be generated in an easy manner.

As above, an example in which a synthesized image is generated by using captured images generated consecutively by the imaging unit has been represented. Here, for example, an embodiment of the present invention can be applied to a case where a synthesized image is generated by extracting only an observed subject from the captured image and synthesizing the extracted observed subject to a different background image in an overlapping manner. Thus, hereinafter, an example in which a synthesized image is generated by synthesizing an observed subject extracted from the captured image to a different background image in an overlapping manner will be described.

Example of Generation of Synthesized Image by Overlapping Observed Subject with Background Image FIGS. 28A and 28B are diagrams schematically representing the flow of generation of a synthesized image by using the imaging apparatus 700 according to the third embodiment of the present invention. FIG. 28A represents an image group 800 as a synthesis target and a background image 805. The image group 800 is an image group that is configured by captured images 801 to 804 that are photographed by vertical shooting. In the captured images 801 to 804, a person 806 who performs a predetermined operation (for example, an operation of jumping in the vertical direction) is included. The background image 805 is a captured image that is imaged by horizontal shooting, and trees and the sun are included in the background image 805.

FIG. 28B represents synthesized images 811 to 814 acquired by synthesizing the images of the observed subjects included in the captured images 801 to 804 and the background image 805.

For example, the processing information that is associated with the imaging operation state designated on the imaging operation state designating screen 200 shown in FIG. 6A and the predetermined operation of the observed subject that is designated by the predetermined operation designating screen 730 shown in FIG. 25 is acquired. Then, based on the acquired processing information, each processing process is performed for the captured images 801 to 804. Subsequently, the observed subject (person 806) included in the captured images 801 to 804 for which the processing process has been performed is extracted. Then, by synthesizing the image of the extracted observed subject to near the center position of the background image 805 in the horizontal direction, the synthesized images 811 to 814 shown in FIG. 28B are generated. These synthesized images 811 to 814 may be disposed so as to be aligned as shown in FIGS. 5A to 5C or the like.

4. Fourth Embodiment

In the first to third embodiments of the present invention, an imaging apparatus for which the imaging range is horizontally long in a case where the vertical direction of the user and the vertical direction of the imaging apparatus are the same has been described as an example. Here, as another example of the imaging apparatus, a cellular phone device (a so-called cellular phone device provided with a camera) including an imaging unit will be considered. This cellular phone device, for example, in order to use a calling function or a mailing function, is frequently used in the state in which the longitudinal direction thereof becomes the vertical direction. Accordingly, in an ordinary use state of the cellular phone device, there are many cases where the imaging range is vertically long. Thus, in the fourth embodiment of the present invention, a cellular phone device for which the imaging range is vertically long in an ordinary use state will be described.

Example of External Configuration of Cellular Phone Device

Figure 29A:
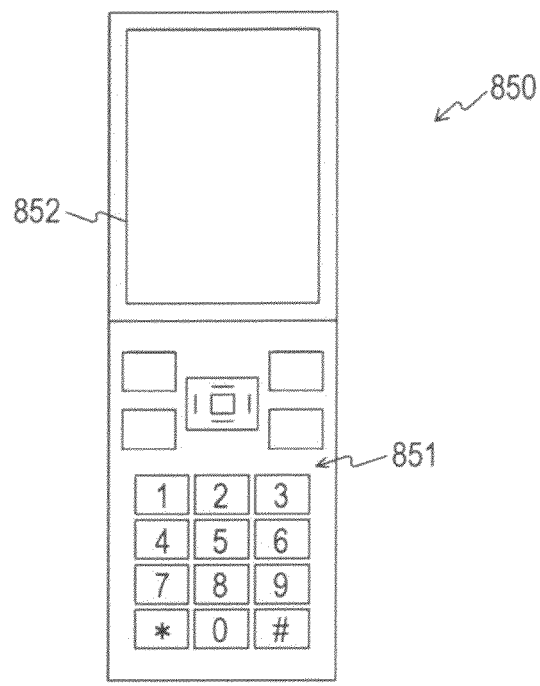
FIGS. 29A and 29B are diagrams representing an example of the external configuration of a cellular phone device according to the fourth embodiment of the present invention.
Figure 29B:
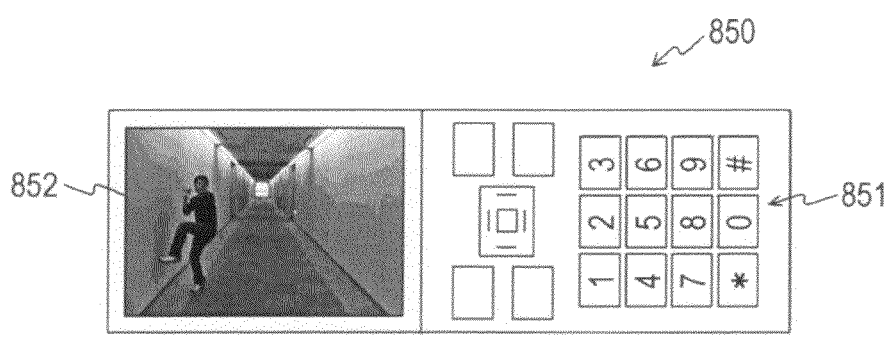

FIGS. 29A and 29B are diagrams representing an example of the external configuration of a cellular phone device 850 according to the fourth embodiment of the present invention. The cellular phone device 850 is a cellular phone device including an imaging unit and further includes an operation unit 851 and a display unit 852. FIG. 29A shows the front side of one form when the cellular phone device 850 is used, and FIG. 29B shows the front side of another form when the cellular phone device 850 is used.

As described above, the cellular phone device 850 is frequently used in the state as shown in FIG. 29A at the time of the ordinary use. Thus, the imaging range at this state is set as a reference. Thus, by switching between values of the horizontal shooting and the vertical shooting of the rotation angle (for example, the rotation angle 721 shown in FIG. 26) of the processing information storing unit according to the first to third embodiments of the present invention, the first to third embodiments of the present invention can be applied to the cellular phone device 850. For example, in a case where the baseball (pitching) is photographed in the imaging operation state shown in FIG. 29B, by performing the processing process shown in FIG. 27B after the rotation process is performed, a synthesized image 785 shown in FIG. 27C can be generated.

In addition, in the embodiments of the present invention, an imaging apparatus including an imaging unit as an example of an image input unit has been described as an example. However, an embodiment of the present invention can be applied to an image processing apparatus including an input unit to which consecutively imaged still-image group generated externally or a frame image group of a moving image is input. In addition, in the embodiment of the present invention, an imaging apparatus including a display unit as an example of an output unit has been described as an example. However, the generated synthesized image may be output to another output unit. For example, an output unit that expands the generated synthesized image into a memory or writes the synthesized image into an external storage medium such as a hard disk, a flash memory, or a network destination may be included.

In the embodiments of the present invention, an example in which a synthesized image of still images is generated has been represented. However, an embodiment of the present invention can be applied to a synthesized image generating process in which the procedure of generation of a synthesized image is displayed as a moving image. In addition, for the synthesis target images for which the processing process has been performed, for example, may be used as a plurality of images (for example, images used for a slide show) that represent the transition in a predetermined operation other than being used as synthesis targets.

In addition, an embodiment of the present invention can be applied to an image processing apparatus such as a personal computer, a video system, or an editing device. In addition, the processing procedure according to an embodiment of the present invention can be embedded in a processing program.

In addition, an embodiment of the present invention represents an example for implementing the present invention. Thus, as described in the embodiments of the present invention, each item of the embodiments of the present invention and each invention specifying item have the correspondence relationship. Similarly, each invention specifying item and the item, which has the same name, of the embodiments of the present invention have the correspondence relationship. However, the present invention is not limited to the embodiments. Thus, an embodiment of the present invention can be implemented by making various changes in the above-described embodiments in the scope not departing from the concept of the present invention.

In addition, the processing procedure described in the embodiments of the present invention may be perceived as a method having a series of such a processing procedure, and may be conceived as a program for allowing a computer to perform the series of the procedure or a recording medium storing the program therein. As the recording medium, for example, a CD (Compact Disc), an MD (MiniDisc), a DVD (Digital Versatile Disk), a memory card, a Blu-ray Disc (registered trademark), or the like can be used.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   an imaging operation state acquiring unit that acquires imaging operation state information representing imaging operation states at the time of an imaging operation for a plurality of images that are consecutively generated in a time series;
   an image processing unit that performs image processing, which is used for generating a synthesized image representing transition in a specific operation of an observed subject included in the plurality of images, based on the acquired imaging operation state information for the plurality of images; and
   an image synthesis unit that generates the synthesized image by synthesizing the plurality of images for which the image processing has been performed,
   wherein the imaging operation state acquiring unit acquires a rotation angle with an imaging direction at the time of the imaging operation being used as an axis as the imaging operation state information,
   wherein the image processing unit performs a rotation process for each of the plurality of images in accordance with the rotation angle that is specified by the imaging operation state information,
   wherein, in a case where the rotation angle specified by the imaging operation state information is a predetermined angle, the image processing unit performs the rotation process for each of the plurality of images, and
   wherein, in a case where the rotation angle specified by the imaging operation state information is not the predetermined angle, the image processing unit does not perform the rotation process for the plurality of images.

2. The image processing apparatus according to claim 1, wherein the image processing unit performs the image processing so as to allow the plurality of images, for which the rotation process is performed in a case where the rotation angle specified by the imaging operation state information is the predetermined angle, and the plurality of images, for which the rotation process is not performed in a case where the rotation angle specified by the imaging operation state information is not the predetermined angle, to have a predetermined size corresponding to a size of the synthesized image.

3. The image processing apparatus according to claim 1, wherein the image processing unit performs the image process so as to allow each of the plurality of images to have a predetermined size corresponding to the size of the synthesized image.

4. The image processing apparatus according to claim 1, further comprising:
   a storage unit that stores processing information relating to a plurality of types of predetermined operations; and
   an operation receiving unit that receives a designation operation that designates a desired predetermined operation from among the plurality of types of the predetermined operations in which the processing information is stored.

5. An imaging apparatus comprising:
   an imaging unit that generates a plurality of images that are consecutive in a time series by imaging a subject;
   an imaging operation state acquiring unit that acquires imaging operation state information representing imaging operation states at the time of an imaging operation for the plurality of generated images;
   an image processing unit that performs image processing, which is used for generating a synthesized image representing transition in a specific operation of an observed subject included in the plurality of images, based on the acquired imaging operation state information for the plurality of images; and
   an image synthesis unit that generates the synthesized image by synthesizing the plurality of images for which the image processing has been performed,
   wherein the imaging operation state acquiring unit acquires a rotation angle with an imaging direction at the time of the imaging operation being used as an axis as the imaging operation state information,
   wherein the image processing unit performs a rotation process for each of the plurality of images in accordance with the rotation angle that is specified by the imaging state information,
   wherein, in a case where the rotation angle specified by the imaging operation state information is a predetermined angle, the image processing unit performs the rotation process for each of the plurality of images, and
   wherein, in a case where the rotation angle specified by the imaging operation state information is not the predetermined angle, the image processing unit does not perform the rotation process for the plurality of images.

6. An image processing method comprising the steps of:
   acquiring imaging operation state information representing imaging operation states at the time of an imaging operation for a plurality of images that are consecutively generated in a time series;
   performing image processing, which is used for generating a synthesized image representing transition in a specific operation of an observed subject included in the plurality of images, based on the acquired imaging operation state information for the plurality of images; and
   generating a synthesized image by synthesizing the plurality of images for which the image processing has been performed,
   wherein the acquiring step acquires a rotation angle with an imaging direction at the time of the imaging operation being used as an axis as the imaging operation state information,
   wherein the performing step performs a rotation process for each of the plurality of images in accordance with the rotation angle that is specified by the imaging operation state information,
   wherein, in a case where the rotation angle specified by the imaging operation state information is a predetermined angle, the processing step performs the rotation process for each of the plurality of images, and
   wherein, in a case where the rotation angle specified by the imaging operation state information is not the predetermined angle, the processing step does not perform the rotation process for the plurality of images.

7. A non-transitory computer readable recording medium having stored thereon a program allowing a computer to perform:
   acquiring imaging operation state information representing imaging operation states at the time of an imaging operation for a plurality of images that are consecutively generated in a time series;
   performing image processing, which is used for generating a synthesized image representing transition in a specific operation of an observed subject included in the plurality of images, based on the acquired imaging operation state information for the plurality of images; and
   generating a synthesized image by synthesizing the plurality of images for which the image processing has been performed,
   wherein the acquiring acquires a rotation angle with an imaging direction at the time of the imaging operation being used as an axis as the imaging operation state information,
   wherein the processing performs a rotation process for each of the plurality of images in accordance with the rotation angle that is specified by the imaging operation state information,
   wherein, in a case where the rotation angle specified by the imaging operation state information is a predetermined angle, the processing performs the rotation process for each of the plurality of images, and
   wherein, in a case where the rotation angle specified by the imaging operation state information is not the predetermined angle, the processing does not perform the rotation process for the plurality of images.

* * * * *